US008825755B2

(12) United States Patent
Waki et al.

(10) Patent No.: US 8,825,755 B2
(45) Date of Patent: Sep. 2, 2014

(54) INFORMATION PROCESSING DEVICE, INFORMATION PROCESSING METHOD, PROGRAM, AND INFORMATION PROCESSING SYSTEM

(75) Inventors: Naoki Waki, Saitama (JP); Tomoharu Hikita, Tokyo (JP); Jun Hataoka, Saitama (JP); Mitsuhiro Kimura, Kanagawa (JP); Keitarou Watanabe, Tokyo (JP)

(73) Assignee: FeliCa Networks, Inc. (JP)

( * ) Notice: Subject to any disclaimer, the term of this patent is extended or adjusted under 35 U.S.C. 154(b) by 87 days.

(21) Appl. No.: 13/569,404

(22) Filed: Aug. 8, 2012

(65) Prior Publication Data

US 2013/0046814 A1    Feb. 21, 2013

(30) Foreign Application Priority Data

Aug. 15, 2011 (JP) ................................. 2011-177517

(51) Int. Cl.
 *G06F 15/16* (2006.01)
(52) U.S. Cl.
 USPC ............... 709/203; 709/202; 709/226; 726/3; 375/240
(58) Field of Classification Search
 CPC ..................... G06F 17/30569; H04L 63/1466; H04L 63/1491; H04L 65/1006; H04L 65/4084; H04L 65/80
 USPC ................ 709/202, 203, 226; 726/3; 375/240
 See application file for complete search history.

(56) References Cited

U.S. PATENT DOCUMENTS

| 6,163,796 | A  | * | 12/2000 | Yokomizo ..................... 709/203 |
| 6,751,734 | B1 | * | 6/2004  | Uchida ......................... 713/186 |
| 7,072,975 | B2 | * | 7/2006  | Kato ............................. 709/237 |
| 8,266,621 | B2 | * | 9/2012  | Murata et al. ................. 718/102 |
| 8,463,636 | B2 | * | 6/2013  | Ahsan et al. ................. 705/7.14 |
| 8,504,607 | B2 | * | 8/2013  | Dewa ........................... 709/202 |
| 8,676,242 | B2 | * | 3/2014  | Zhang .......................... 455/518 |

(Continued)

FOREIGN PATENT DOCUMENTS

| EP | 2237151 A1 | 10/2010 |
| JP | 2010-244168 A | 10/2010 |
| WO | 0153937 A2 | 7/2001 |

OTHER PUBLICATIONS

European Search Report EP 12173419, dated Nov. 6, 2012.

*Primary Examiner* — Tesfay Yohannes
(74) *Attorney, Agent, or Firm* — Lerner, David, Littenberg, Krumholz & Mentlik, LLP

(57) ABSTRACT

Provided is an information processing device including a determination unit that determines, based on process-related information acquired from a first server that provides a service, if a process based on the process-related information is executable; a process control unit that makes, if it is not determined that the process is executable, the process based on the process-related information executable by an application that performs processes corresponding to a plurality of services; and a processing unit that causes the application to execute the process based on the process-related information. The process control unit causes a second server to generate, based on the process-related information, a processing instruction that is based on the process-related information, and the processing unit causes the application to execute a process indicated by the generated processing instruction.

9 Claims, 11 Drawing Sheets

(56) References Cited

U.S. PATENT DOCUMENTS

| | | | |
|---|---|---|---|
| 2008/0178265 A1* | 7/2008 | Tsuchiya et al. | 726/3 |
| 2009/0006638 A1* | 1/2009 | George et al. | 709/230 |
| 2009/0276505 A1* | 11/2009 | Imai | 709/219 |
| 2010/0166081 A1* | 7/2010 | Onoye et al. | 375/240.25 |
| 2010/0257224 A1 | 10/2010 | Tobita | |
| 2010/0332636 A1* | 12/2010 | Sato et al. | 709/223 |
| 2011/0004687 A1* | 1/2011 | Takemura | 709/226 |
| 2011/0019647 A1* | 1/2011 | Fujino | 370/331 |
| 2011/0126192 A1 | 5/2011 | Frost et al. | |
| 2011/0145329 A1* | 6/2011 | Fukasawa | 709/203 |

* cited by examiner

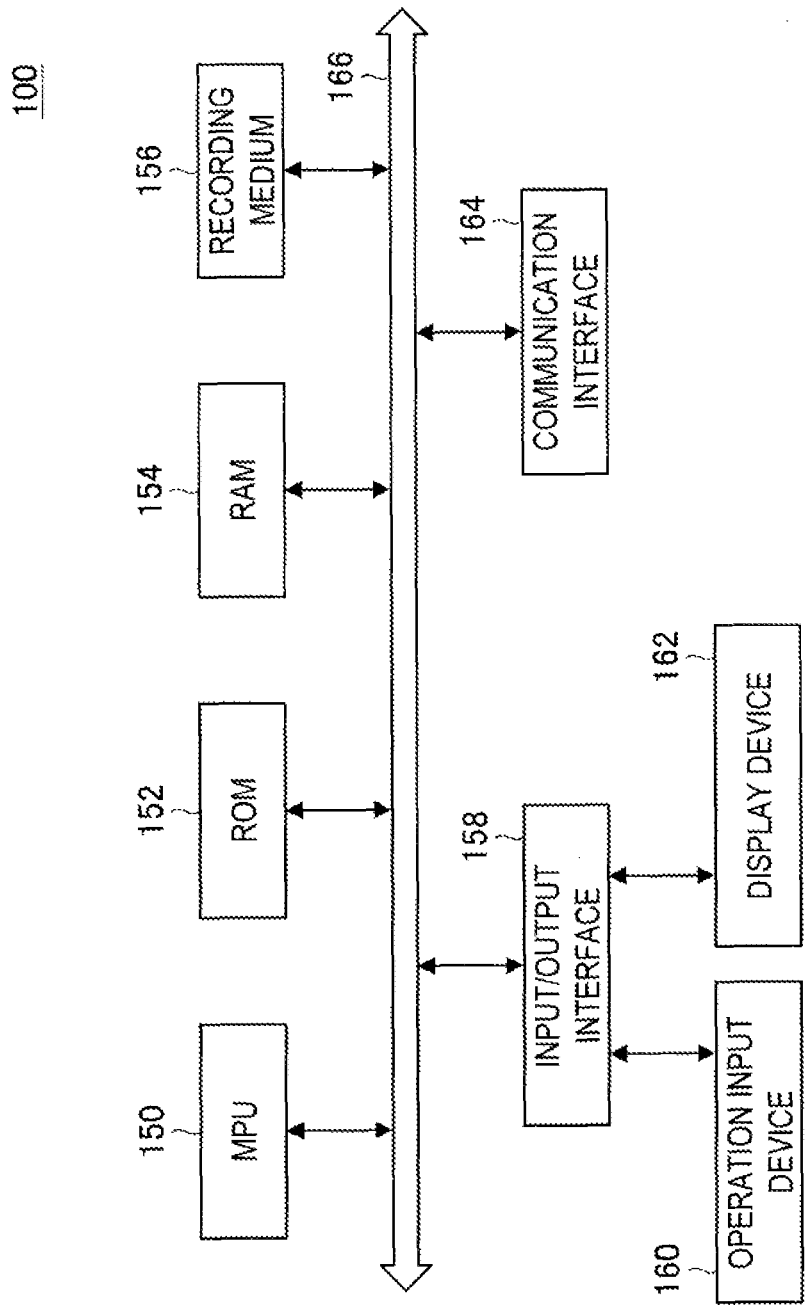

INFORMATION PROCESSING DEVICE, INFORMATION PROCESSING METHOD, PROGRAM, AND INFORMATION PROCESSING SYSTEM

CROSS-REFERENCE TO RELATED APPLICATION

The present application claims priority from Japanese Patent Application No. JP 2011-177517 filed in the Japanese Patent Office on Aug. 15, 2011, the entire content of which is incorporated herein by reference.

BACKGROUND

The present disclosure relates to an information processing device, an information processing method, a program, and an information processing system.

In recent years, information processing devices that can communicate wirelessly with readers/writers (or information processing devices having a reader/writer function), such as a wireless IC (Integrated Circuit) card or a portable phone having a wireless IC chip mounted thereon, for example, have come into widespread use. Readers/writers and information processing devices such as IC cards or portable phones use a magnetic field (carrier wave) with a predetermined frequency such as 13.56 [MHz], for example, for communication. Specifically, a reader/writer and an information processing device such as an IC card can communicate with each other in such a way that the reader/writer transmits a carrier wave with a carrier signal superimposed thereon, and the information processing device, which has received the carrier wave with an antenna, returns a response signal in response to the received carrier signal through load modulation.

An information processing device such as the one described above can, by having an IC chip with a tamper-resistant property, safely perform transmission/reception of and update to data, which may possibly be tampered, such as electronic money or data for receiving privileges associated with services, for example. Thus, provision of various services using an information processing device, which has mounted thereon an IC chip that can communicate wirelessly with a reader/writer as described above, is widely spread in the society. A user can receive various services using a single information processing device.

Herein, examples of a method of causing an information processing device to perform processes corresponding to various services include causing the information processing device to execute a different application for each service. However, when such a method is used, it would be necessary to mount an application corresponding to each service on the information processing device in advance.

Against such a background, a technology of causing a single application to perform different behaviors is developed. As a technology of causing an agent (a single application) to, by acquiring from a server a roll that defines the behavior of the agent, perform a process corresponding to the acquired roll, a technology disclosed in JP 2010-244168A is given as an example.

SUMMARY

For example, in the technology disclosed in JP 2010-244168A that causes a single application to perform different behaviors (hereinafter also referred to as "related art"), an information processing device acquires from a server a roll that defines the behavior of an agent, and causes the agent to perform a process corresponding to the acquired roll. Herein, a "roll" in the related art is script data having described therein a part of information about a process. Accordingly, when the related art is used, it is possible to cause an agent (a single application) to perform different behaviors.

Herein, some processes that are executed in an information processing device can be executed only by an application that matches a specific condition. However, the technology disclosed in JP 2010-244168A does not take into consideration means for grasping an application that matches a specific condition on the information processing device side. Thus, even when the related art is used, there is a possibility that an agent, which is a single application executed by the information processing device, may not be able to behave differently for each service according to a condition.

In view of the foregoing, the present disclosure provides an information processing device, an information processing method, a program, and an information processing system that are novel and improved and that can cause an application, which can perform processes corresponding to a plurality of services, to behave differently for each service.

According to an embodiment of the present disclosure, there is provided an information processing device including a determination unit that determines, based on process-related information acquired from a first server that provides a service, if a process based on the process-related information is executable; a process control unit that makes, if it is not determined that the process is executable, the process based on the process-related information executable by an application that performs processes corresponding to a plurality of services; and a processing unit that causes the application to execute the process based on the process-related information. The process control unit causes a second server to generate, based on the process-related information, a processing instruction that is based on the process-related information, and the processing unit causes the application to execute a process indicated by the generated processing instruction.

According to another embodiment of the present disclosure, there is provided an information processing method including determining, based on process-related information acquired from a first server that provides a service, if a process based on the process-related information is executable; making, if it is not determined that the process is executable, the process based on the process-related information executable by an application that performs processes corresponding to a plurality of services; and executing, with the application, the process based on the process-related information. The step of making the execution of the process executable includes causing a second server to generate, based on the process-related information, a processing instruction that is based on the process-related information, and the executing step includes executing a process indicated by the generated processing instruction.

According to still another embodiment of the present disclosure, there is provided a program causing a computer to execute determining, based on process-related information acquired from a first server that provides a service, if a process based on the process-related information is executable; making, if it is not determined that the process is executable, the process based on the process-related information executable by an application that performs processes corresponding to a plurality of services; and executing, with the application, the process based on the process-related information. The step of making the execution of the process executable includes causing a second server to generate, based on the process-related information, a processing instruction that is based on the process-related information, and the executing step includes executing a process indicated by the generated processing instruction.

According to further another embodiment of the present disclosure, there is provided an information processing system including an information processing device; and a server that communicates with the information processing device. The information processing device includes a determination unit that determines, based on process-related information acquired from a first server that provides a service, if a process based on the process-related information is executable; a process control unit that makes, if it is not determined that the process is executable, the process based on the process-related information executable by an application that performs processes corresponding to a plurality of services; and a processing unit that causes the application to execute the process based on the process-related information. The process control unit causes a second server to generate, based on the process-related information, a processing instruction that is based on the process-related information, and the processing unit causes the application to execute a process indicated by the generated processing instruction.

According to the present disclosure, it is possible to cause an application, which can perform processes corresponding to a plurality of services, to behave differently for each service.

BRIEF DESCRIPTION OF THE DRAWINGS

FIG. 11 is an explanatory diagram showing an exemplary hardware configuration of an information processing device in accordance with this embodiment.

DETAILED DESCRIPTION OF THE EMBODIMENTS

Figure 1:
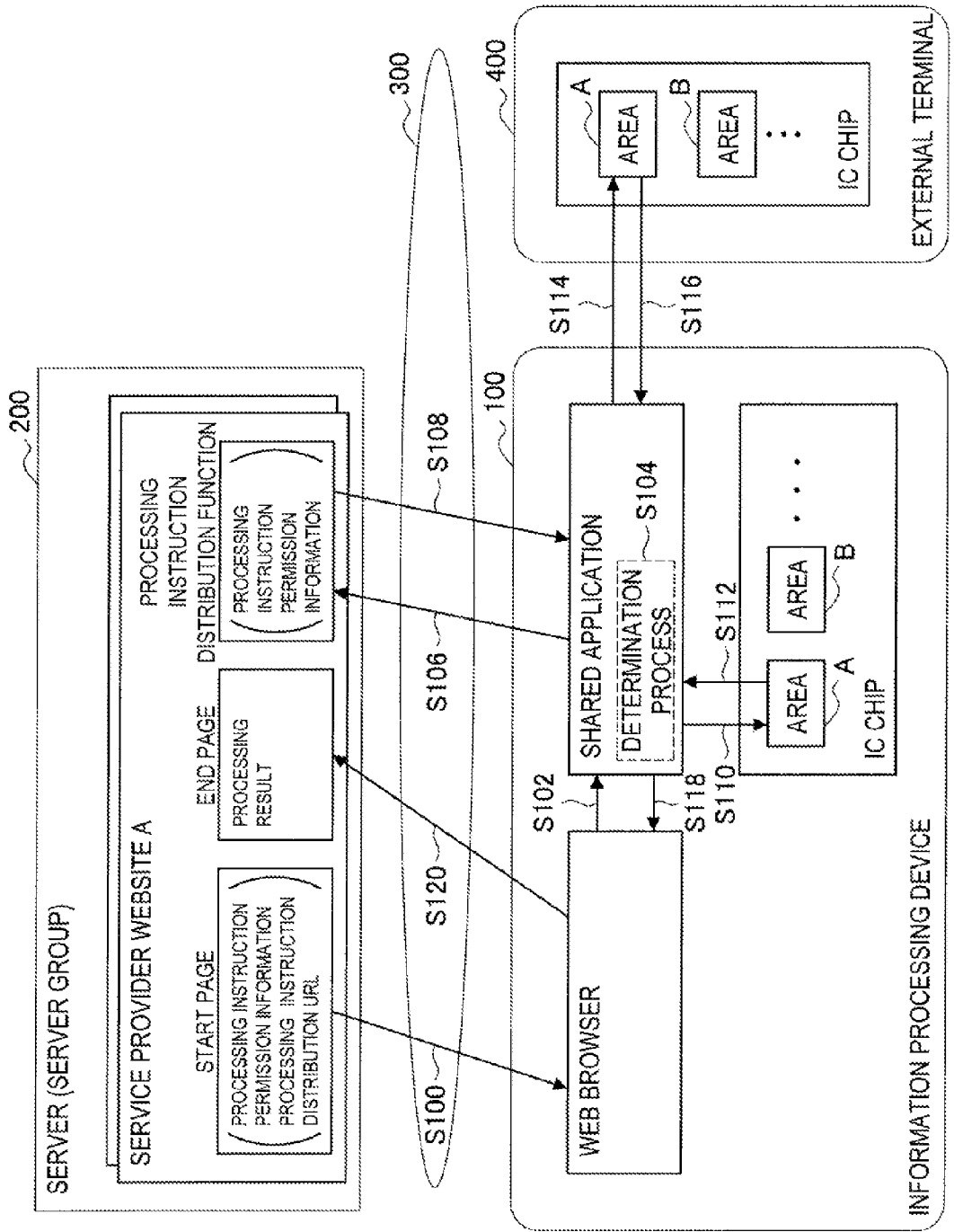
FIG. 1 is an explanatory diagram showing a first example of a process in accordance with an information processing method in accordance with this embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, description will be made in the following order.

1. Information Processing Method in accordance with this Embodiment
2. Information Processing Device in accordance with this Embodiment
3. Program in accordance with this Embodiment (Information Processing Method in Accordance with this Embodiment)

Before describing the configuration of an information processing device in accordance with this embodiment (hereinafter referred to as an "information processing device 100"), an information processing method in accordance with this embodiment will be described. In addition, the following description is based on the assumption that the information processing device in accordance with this embodiment performs a process in accordance with the information processing method in accordance with this embodiment.

[Summary of Information Processing Method in Accordance with this Embodiment]

As described above, it is not always the case that the function of a service managed by a service provider and a service providing method are identical among different service providers. Thus, the information processing device 100 in accordance with this embodiment determines, based on process-related information acquired from a server (a first server) that provides a service, if a process based on the process-related information is executable (a determination process). In addition, the information processing device 100, if it is not determined that the process is executable, makes the process based on the process-related information executable (an execution control process). Then, the information processing device 100 executes, with an application that can perform processes corresponding to a plurality of services (hereinafter referred to as a "shared application"), the process based on the process-related information (an execution process).

As described above, the information processing device 100 performs a determination process, and selectively performs an execution control process in accordance with the result of the determination process, and then performs an execution process. Herein, if the execution control process is not performed in the information processing device 100, the shared application can execute a process based on the acquired process-related information. Meanwhile, if the execution control process is performed in the information processing device 100, it means that a process based on the process-related information is executable. Thus, the shared application can execute a process based on the acquired process-related information.

Thus, the information processing device 100 in accordance with this embodiment can, by performing the (1) determination process, the (2) execution control process, and the (3) execution process, cause a shared application, which can perform processes corresponding to a plurality of services, to behave differently for each service.

Hereinafter, a process in accordance with the information processing method in accordance with this embodiment will be described.

(1) Determination Process

The information processing device 100 determines, based on the acquired process-related information, if a shared application can perform a process related to a service using acquired process-related information, for example.

Herein, the process-related information in accordance with this embodiment is, for example, information (data) for causing the information processing device 100 to perform some process. Examples of the process-related information in accordance with this embodiment include a "processing instruction," "permission information," "identifying information and a parameter defining the type of a process," "setting instruction," and "condition information."

The processing instruction in accordance with this embodiment is data that is defined by a service provider and that defines a process to be executed by the shared application. Examples of the processing instruction include script data.

The information processing device 100, if the process-related information indicates a processing instruction, determines that a process is executable. In such a case, the information processing device 100 causes the shared application to execute a process corresponding to the processing instruction in the process of (3) (the execution process).

The permission information in accordance with this embodiment is data for performing control such that the shared application authenticates a service provider, and the shared application is allowed to execute only a process in accordance with the authority of the service provider. Examples of the permission information in accordance with this embodiment include information indicating an area of a storage medium that is accessible from the application, and information indicating the expiration date of the permission information. In addition, the permission information in accordance with this embodiment is issued to a service provider by an administrator who manages the shared application, for example.

The information processing device 100, if the process-related information indicates a processing instruction and permission information, determines that a process is executable, and causes the shared application to perform a process corresponding to the processing instruction within the limit indicated by the permission information in the process of (3) (the execution process).

The identifying information in accordance with this embodiment is data that identifies a server (a second server) to generate a processing instruction based on the process-related information, and the parameter defining the type of a process in accordance with this embodiment is a parameter for causing the second server to generate a processing instruction related to a specific process. Examples of the identifying information in accordance with this embodiment include a URL and IP (Internet Protocol) address indicating the second server. Hereinafter, a case where the identifying information is a URL will be exemplarily described, and the identifying information may also be indicated by a "processing instruction distribution URL." Note that the server (the first server) from which the information processing device 100 acquires process-related information, and the server (the second server) that generates a processing instruction based on the process-related information may be either the same server or different servers (e.g., physically different servers or servers whose administrators are different) (hereinafter the same).

The information processing device 100, if the process-related information indicates identifying information and a parameter defining the type of a process, determines that a process is not executable. In such a case, the information processing device 100 executes the process of (3) (the execution process) after executing the process of (2) (the execution control process).

The setting instruction in accordance with this embodiment is, for example, data for changing a process executed by the shared application. Herein, examples of the setting instruction in accordance with this embodiment include information that identifies a server to generate the real data (hereinafter referred to as "customize data") related to a change of the process executed by the shared application, and a parameter related to the generation. Hereinafter, the setting instruction may also be indicated by a "customize instruction." Note that the setting instruction in accordance with this embodiment is not limited to such example, and may be customize data itself, for example. The customize data can be rephrased as data that is necessary for the shared application to execute a process defined by a service provider.

The information processing device 100, if the process-related information further includes a setting instruction in addition to the "processing instruction" or the "identifying information and the parameter defining the type of a process," determines that a process is not executable. In such a case, the information processing device 100 performs the process of (3) (the execution process) after performing the process of (2) (the execution control process).

The "condition information" in accordance with this embodiment is data indicating a condition related to the version of the shared application that is permitted to execute a process, for example. Examples of the condition information in accordance with this embodiment include a parameter indicating the value of the version of the shared application that is necessary to execute a process. That is, the condition information in accordance with this embodiment indicates the version of the shared application that is necessary to perform a process defined by the service provider.

The information processing device 100, if the process-related information includes condition information, for example, determines if the shared application satisfies the condition indicated by the condition information. Herein, the information processing device 100, for example, compares the value of the version of the shared application with the value of the version indicated by the condition information, and determines that, if the value of the version of the shared application is greater than or equal to the value of the version indicated by the condition information, the condition indicated by the condition information is satisfied.

If it is determined that the shared application satisfies the condition indicated by the condition information, the information processing device 100 determines, based on another information included in the process-related information, if a process based on the process-related information is executable. Meanwhile, if it is not determined that the shared application satisfies the condition indicated by the condition information, the information processing device 100 updates the shared application in the process of (2) (the execution control process). Then, the information processing device 100 again determines if the shared application satisfies the condition indicated by the condition information, for example.

The information processing device 100, in the determination process, determines if a process based on the process-related information is executable as described above, for example. Note that the process of (1) (the determination process) of the information processing device 100 in accordance with this embodiment is not limited to the aforementioned example. For example, the process-related information can include a combination of a plurality of pieces of the aforementioned information. In such a case, the information processing device 100 performs determination based on each of the plurality of pieces of information included in the process-related information, and, if any of the determination results indicates that "a process is not executable," determines that the process is not executable. Then, the information processing device 100 performs the process of (3) (the execution process) after performing the process of (2) (the execution control process) corresponding to the determination result based on each of the plurality of pieces of information included in the process-related information.

(2) Execution Control Process

The information processing device 100, if it is not determined that a process is executable in the process of (1) (the determination process), causes the server (the second server) to generate, based on the process-related information, a processing instruction based on the process-related information. The information processing device 100 can, by causing the server to generate a processing instruction (e.g., script data) and acquiring the processing instruction from the server, cause the shared application to perform a process in accordance with the processing instruction. Accordingly, the information processing device 100 can, through the process of (2) (the execution control process), execute a process based on the process-related information with the shared application.

More specifically, for example, if the process-related information includes identifying information and a parameter defining the type of a process, the information processing device 100 transmits a generation request including the parameter to a server indicated by the identifying information. By transmitting the generation request, the information processing device 100 can cause the server, which has received the generation request, to generate a processing instruction corresponding to the parameter and transmit the generated processing instruction to the information processing device 100. Accordingly, the information processing device 100 can acquire a processing instruction from the server (the second server) indicated by the identifying information.

If the process-related information further includes a setting instruction in addition to the "processing instruction" or the "identifying information and the parameter defining the type of a process," the information processing device 100, for example, transmits a request to a server indicated by the setting instruction to transmit setting data, and causes the server to transmit setting data corresponding to the setting instruction. Accordingly, the information processing device 100 can cause the shared application to execute a process using the acquired setting data in the process of (3) (the execution process).

In addition, if it is not determined that the shared application satisfies the condition indicated by the condition information in the process of (1) (the determination process), the information processing device 100 causes a server, which stores update data for updating the shared application, to transmit the update data. Then, the information processing device 100 updates the shared application using the acquired update data. Herein, the information processing device 100 references information, which identifies a server storing the update data, included in a Web page (a process resuming page described below) for resuming the process related to a service that is interrupted during the execution of the process of updating the shared application, for example. Then, the information processing device 100, by transmitting a request to a server indicated by the referenced information to transmit update data, causes the server to transmit the update data. Examples of information that identifies a server storing the update data include data indicating a URL or IP address and a processing parameter.

Note that the method of transmitting an update data transmission request in the information processing device 100 in accordance with this embodiment is not limited to the aforementioned example. For example, the information processing device 100 may, by referencing information, which identifies a server storing update data, stored in advance in a storage unit (described below), for example, and transmitting a request to the server indicated by the information to transmit update data, cause the server to transmit the update data. In addition, the information processing device 100 may, if the condition information includes information that identifies a server storing update data, transmit an update data transmission request by referencing the condition information.

Further, if it is not determined that the shared application satisfies the condition indicated by the condition information in the process of (1) (the determination process), the information processing device 100 interrupts the execution of the process of the shared application that is based on the process-related information. Then, the information processing device 100, after the completion of the update of the shared application, resumes the process of the shared application that is based on the process-related information.

The information processing device 100 performs the aforementioned process, for example, in the process of (2) (the execution control process).

(3) Execution Process

The information processing device 100 causes the shared application to execute a process based on the process-related information acquired from the first server.

More specifically, if it is determined that a process can be executed in the process of (1) (the determination process), the information processing device 100, for example, causes the shared application to execute a process based on a processing instruction (an example of the process-related information) acquired from the server (the first server) that provides a service. In addition, in the aforementioned case, if the process-related information acquired from the server further includes permission information, the information processing device 100 causes the shared application to execute a process based on the processing instruction within the limit indicated by the permission information, for example.

Meanwhile, if it is not determined that a process can be executed in the process of (1) (the determination process), the information processing device 100 causes the shared application to execute a process based on the acquired process-related information that has become executable by the process of (2) (the execution control process).

The information processing device 100, as a process in accordance with the information processing method in accordance with this embodiment, performs the process of (1) (the determination process) to the process of (3) (the execution process) such as those described above, for example. Herein, if the process of (2) (the execution control process) is not performed in the information processing device 100, the shared application executes a process based on the process-related information acquired from the server (the first server) that provides a service. Meanwhile, if the process of (2) (the execution control process) is performed in the information processing device 100, it follows that a process based on the process-related information is executable. Thus, the shared application can execute a process based on the acquired process-related information.

Thus, through the process of (1) (the determination process) to the process of (3) (the execution process) described above, the information processing device 100 can cause a shared application, which can execute processes corresponding to a plurality of services, to behave differently for each service.

[Specific Example of Process in Accordance with Information Processing Method in Accordance with this Embodiment]

Next, a process in accordance with the information processing method in accordance with this embodiment will be described more specifically. Hereinafter, description will be made mainly of an example in which the information processing device 100 includes an IC chip having set therein a plurality of areas corresponding to services, and the information processing device 100, with a shared application, performs data writing to or data reading from an area of the IC chip corresponding to a service as a process corresponding to the service. Note that a process corresponding to a service in accordance with this embodiment is not limited thereto. Information on a process corresponding to a service in accordance with this embodiment can be defined in the process-related information by a service provider. Accordingly, as a process corresponding to a service in accordance with this embodiment, any given process related to the provision of a service can be given as an example.

Hereinafter, description will be made of an example in which the information processing device 100 performs the process of (1) (the determination process) to the process of (3) (the execution process) with a shared application executed. It is needless to mention that a process in accordance with the information processing method in accordance with this embodiment is not limited to a case where the process of (1) (the determination process) to the process of (3) (the execution process) are performed with a shared application executed.

[I] First Example

FIG. 1 is an explanatory diagram showing a first example of a process in accordance with the information processing method in accordance with this embodiment. Herein, FIG. 1 shows an example in which the information processing device 100 acquires process-related information via a Website of a service provider, and performs a process based on the process-related information with a shared application.

FIG. 1 shows an information processing system including an information processing device 100 and a server 200 (or a server group, hereinafter the same) connected thereto via a network 300. FIG. 1 also shows an external terminal 400 that performs wire/wireless communication with the information processing device 100. Herein, examples of the network 300 in accordance with this embodiment include a wired network such as a LAN (Local Area Network) or a WAN (Wide Area Network), a wireless network such as a wireless LAN (WLAN; Wireless Local Area Network) or a wireless WAN (WWAN; Wireless Wide Area Network) with which communication is performed via a base station, and the Internet that uses a communication protocol such as TCP/IP (Transmission Control Protocol/Internet Protocol).

The information processing device 100 displays, with a Web browser, for example, a start page for a process related to a service of a service provider Website A. Herein, the start page is provided with, for example, a link as a trigger for the server 200 to transmit process-related information to an external device such as the information processing device 100. When a user clicks the link by operating the information processing device 100, for example, the server 200 transmits process-related information to the information processing device 100 (S100). Herein, the process-related information transmitted in step S100 includes at least a processing instruction or a processing instruction distribution URL (an example of the identifying information). Note that the Web browser may be an application corresponding to a service provider (hereinafter the same).

The information processing device 10, which has received the process-related information transmitted from the server 200 in step S100, delivers the process-related information from the Web browser to the shared application (S102). Herein, examples of the method of delivering the process-related information in step S102 include methods such as intent and object tag. However, the method of delivering the process-related information is not limited thereto.

The information processing device 100 determines if a process related to a service can be executed with the shared application using the process-related information (S104). The information processing device 100, if the process-related information includes a processing instruction, for example, determines that a process related to a service can be executed using the process-related information, and, if the process-related information includes a processing instruction distribution URL, determines that a process related to a service cannot be executed using the process-related information. Herein, the process of step S104 corresponds to the process of (1) (the determination process).

In step S104, if it is determined that a process related to a service can be executed, the information processing device 100 performs a process of step S110 and a process of step S112 described below or performs a process of step S114 and a process of step S116 described below.

In step S104, if it is not determined that a process related to a service can be executed, the information processing device 100 requests the server 200 to generate a processing instruction (or a processing instruction and permission information) (S106). The information processing device 100, based on a processing instruction distribution URL and a parameter defining the type of a process, for example, transmits a request to the server 200 to generate a processing instruction. Herein, the process of step S106 corresponds to the process of (2) (the execution control process).

The server 200, which has received the request transmitted from the information processing device 100 in step S106, generates a processing instruction corresponding to the request using a processing instruction distribution function, and transmits the processing instruction to the information processing device 100 (S108). Herein, the processing instruction distribution function of the server 200 is a function of generating and distributing a processing instruction with the server 200. Note that the server 200 may further transmit permission information in step S108.

If a processing instruction is acquired as the process-related information from the server 200 in step S100, or if a processing instruction is received in step S108, the information processing device 100 performs a process corresponding to the processing instruction with the shared application. Herein, the processing instruction is the one generated by the server 200. Accordingly, the information processing device 100 can cause the shared application to behave differently for each service. The execution of the process corresponding to the processing instruction corresponds to the process of (3) (the execution process).

More specifically, for example, if the processing instruction defines data reading from or data writing to an area of the IC chip corresponding to the service provider A, the information processing device 100, with the shared application, writes data to or reads data from an area A corresponding to the processing instruction in the IC chip (S110, S112). Alternatively, in the aforementioned case, the information processing device 100 may, with the shared application, write data to or read data from an area A corresponding to the processing instruction in the IC chip of the external terminal 400 (S114, S116). When the process of step S114, S116 is performed, the information processing device 100 has a reader/writer function of transmitting a carrier wave with a predetermined frequency such as 13.56 [MHz], for example.

If the information processing device 100 further receives permission information, the information processing device 100 causes the shared application to execute only a process permitted by the permission information. Herein, the permission information in accordance with this embodiment is data issued by an administrator, who manages the shared application, to a service provider, and the permission information is assigned a signature of the administrator who manages the shared application. In addition, the information processing device 100 verifies the signature of the permission information with the shared application, for example, and, if the result of verification is normal, performs a process within the limit indicated by the permission information. Further, the information processing device 100 may verify the permission information after determining the validity of the permission information.

Herein, examples of the method of determining the validity of the permission information include a method of determining if the acquired permission information is invalid by communicating with a server storing an invalid list of permission information, and a method of determining if the expiration date set in the permission information is valid. A determination process performed in the method of determining if the acquired permission information is invalid may be performed by either the server or the shared application. In addition, if the information processing device 100 acquires an invalid list of permission information from a server before starting the determination process and stores the acquired invalid list of the permission information, the information processing device 100 need not communicate with the server storing the invalid list of the permission information.

By performing a process based on the permission information as described above, for example, data writing to and reading from an area of the IC chip corresponding to another service provider can be prevented in the information processing device 100. Accordingly, the information processing device 100 can cause the shared application to normally perform a different behavior for each service.

The information processing device 100, which has performed a process corresponding to a processing instruction with the shared application, delivers the processing result from the shared application to the Web browser (S118). Herein, examples of the processing result delivered from the shared application to the Web browser include a URL parameter. In addition, examples of the method of delivering a processing result in step S118 include methods such as intent and object tag.

Note that the process of the information processing device 100 in accordance with this embodiment is not limited to the aforementioned example. For example, the information processing device 100 can, by further performing the process of step S106 after performing a process corresponding to a processing instruction with the shared application, perform a process corresponding to a processing instruction a plurality of times. When a process corresponding to a processing instruction is performed with the shared application a plurality of times, a result of the process corresponding to the processing instruction performed a plurality of times, that is, a final result of the process corresponding to the processing instruction performed a plurality of times with the shared application is delivered from the shared application to the Web browser in the information processing device 100. As described above, when a result of the process corresponding to the processing instruction performed a plurality of times is delivered in step S118, it follows that an end page reflecting the result of the process performed a plurality of times through a process of step S120 described below is displayed.

Meanwhile, when a process corresponding to a processing instruction is performed a plurality of times with the shared application, a result of the process corresponding to the processing instruction may be delivered from the shared application to the Web browser in synchronization with the process of step S106 performed again. As described above, when a process corresponding to a processing instruction is performed a plurality of times with the shared application and a processing result is delivered from the shared application to the Web browser in step S118 each time the process corresponding to the processing instruction is performed, the processing result is transmitted from the information processing device 100 to the server 200 through a process of step S120 described below each time the process corresponding to the processing instruction is performed, for example. Then, when a result of the process performed last by the shared application (for example, a process corresponding to a request for terminating the process related to a service transmitted from the server 200 in step S108) is transmitted to the server 20 through a process of step S120 described below, an end page reflecting the result of the processes performed a plurality of times is displayed.

The information processing device 100 transmits a URL parameter (an example of a processing result) to the server 200 via the Web browser (S120).

The server 200, which has received the URL parameter transmitted through the process of step S120, dynamically creates an end page (Web page) indicating the end of the process related to a service using the URL parameter. Note that when a process corresponding to a processing instruction is performed a plurality of times with the shared application as described above, the server 200 may, upon receiving a result of the process corresponding to a request for terminating the process related to a service, dynamically create an end page. Then, the information processing device 100, with the Web browser, for example, displays the end page of the process related to the service of the service provider Website A.

In the information processing system in accordance with this embodiment, a process such as the one shown in FIG. 1 is performed, for example. Through the process shown in FIG. 1, the information processing device 100 can acquire process-related information through a Website of a service provider, and perform a process based on the process-related information with the shared application. Note that a specific example of data transfer between the information processing device 100 and a server such as the server 200 will be described in conjunction with a specific example of data transfer in a second example of a process in accordance with the information processing method in accordance with this embodiment described below.

[II] Second Example

Figure 2:
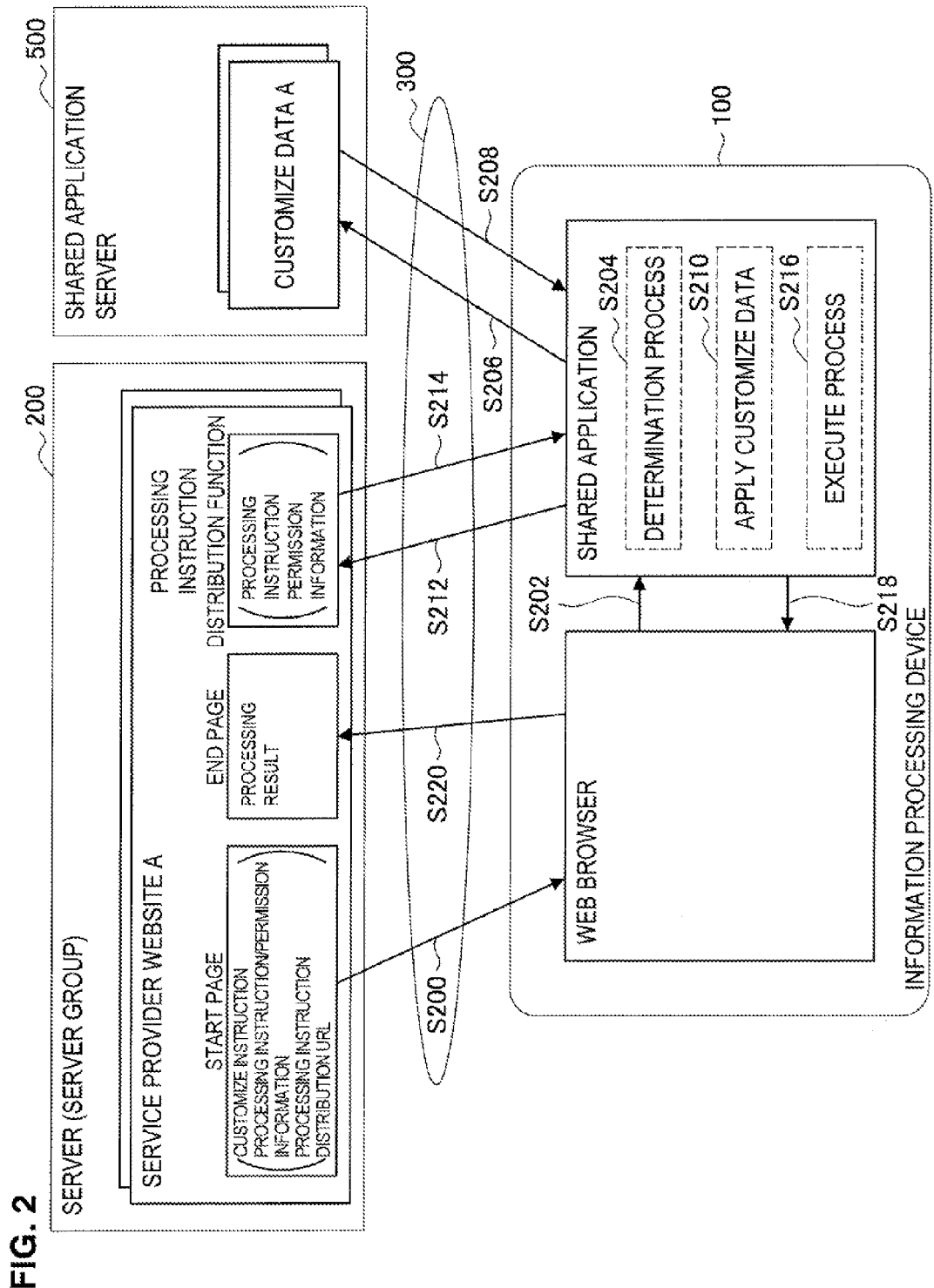
FIG. 2 is an explanatory diagram showing a second example of a process in accordance with an information processing method in accordance with this embodiment.

FIG. 2 is an explanatory diagram showing a second example of a process in accordance with the information processing method in accordance with this embodiment.

Herein, FIG. 2 shows an example in which the information processing device 100 further performs, in addition to a process in accordance with the aforementioned first example, a process based on the process-related information by acquiring customize data. FIG. 2 shows an information processing system including an information processing device 100, a server 200 connected thereto via a network 300, and a shared application server 500.

The information processing device 100 displays, with a Web browser, for example, a start page for a process related to a service of the service provider Website A. Herein, the start page is provided with, for example, a link serving as a trigger for the server 200 to transmit process-related information to an external device such as the information processing device 100. As in step S100 in FIG. 1, when a user clicks the link by operating the information processing device 100, for example, process-related information is transmitted from the server 200 to the information processing device 100 (S200). Herein, examples of the process-related information transmitted in step S200 include at least a processing instruction or a processing instruction distribution URL (an example of the identifying information), and a customize instruction (a setting instruction).

The information processing device 100, which has received the process-related information transmitted from the server 200 in step S200, delivers the process-related information from the Web browser to the shared application as in step S102 in FIG. 1 (S202).

The information processing device 100 determines if a process related to a service can be performed with the shared application using the process-related information (S204). Herein, the process of step S204 corresponds to the process of (1) (the determination process).

In the second example, the process-related information includes a customize instruction. Thus, the information processing device 100 does not determine that a process related to a service is performed using the process-related information. In addition, the information processing device 100, depending on whether the process-related information includes a processing instruction or a processing instruction distribution URL, determines if a process of step 212 described below is necessary.

The information processing device 100, based on the customize instruction, transmits a transmission request to a server, which is indicated by the customize instruction, to transmit customize data (S206). Although FIG. 2 shows an example in which the shared application server 500 stores customize data, the information processing system in accordance with this embodiment is not limited to the example shown in FIG. 2. For example, in the information processing system in accordance with this embodiment, customize data may be stored in the server 200.

The server that has received the request transmitted from the information processing device 100 in step S206 transmits customize data corresponding to the request to the information processing device 100 (S208).

The information processing device 100 that has received the customize data transmitted in step S208 applies the customize data to the shared application (S210). By performing the process of step S210, the information processing device 100 can make a user recognize as if the shared application is a dedicated application for a service provided. In addition, when the customize data is applied to the shared application, it becomes possible for the shared application to change the presented information that is presented to a user during the execution of the process or the presentation method. Thus, when application of the customize data to the shared application is enabled, it becomes possible for the service provider to control the information presented to a user or the presentation method, for example. Herein, examples of the presentation method controlled by the customize data include visual presentation for displaying characters and the like on the display screen and auditory presentation via sound.

Upon termination of the process of step S210, the information processing device 100 requests the server 200 to generate a processing instruction (or a processing instruction and permission information) in accordance with the determination result of the process of step S204 as in step S106 in FIG. 1 (S212). The information processing device 100, if the process-related information is determined to include a processing instruction distribution URL in the process of step S204, performs a process of step S212.

Herein, the process of step S206, the process of step S210, and the process of step S212 in the information processing device 100 correspond to the process of (2) (the execution control process).

The server 200, which has received the request transmitted from the information processing device 100 in step S212, transmits the generated processing instruction to the information processing device 100 as in step S108 in FIG. 1 (S214). Note that the server 200 may further transmit permission information in step S214.

When a processing instruction is acquired as the process-related information from the server 200 in step S200 or when a processing instruction is received in step S214, the information processing device 100 performs a process corresponding to the customize data and the processing instruction with the shared application (S216). Herein, the process of step S216 corresponds to the process of (3) (the execution process).

The information processing device 100, which has performed the process of step S216, delivers the processing result from the shared application to the Web browser as in step S118 in FIG. 1 (S218). Then, the information processing device 100 transmits a URL parameter (an example of a processing result) to the server 200 via the Web browser (S220).

The server 200, which has received the URL parameter transmitted through the process of step S220, dynamically generates an end page (Web page) indicating the end of the process related to the service using the URL parameter. Then, the information processing device 100 displays, using the Web browser, for example, an end page for the process related to the service of the service provider Website A.

In the information processing system in accordance with this embodiment, the process shown in FIG. 2 is performed, for example. Through the process shown in FIG. 2, the information processing device 100 can further perform, in addition to a process related to the aforementioned first example, a process based on the process-related information by acquiring customize data.

Note that the process of the information processing device 100 performed using the customize data in the information processing system in accordance with this embodiment is not limited to the process shown in FIG. 2. For example, when the process-related information acquired through a service provider Website includes customize data (or partial data of the customize data), the information processing device 100 can apply the customize data acquired via the service provider Website to the shared application and perform a process.

Herein, a specific example of data transfer between the information processing device 100 and a server such as the server 200 in a process in accordance with the information processing method in accordance with this embodiment will be described.

Figure 3:
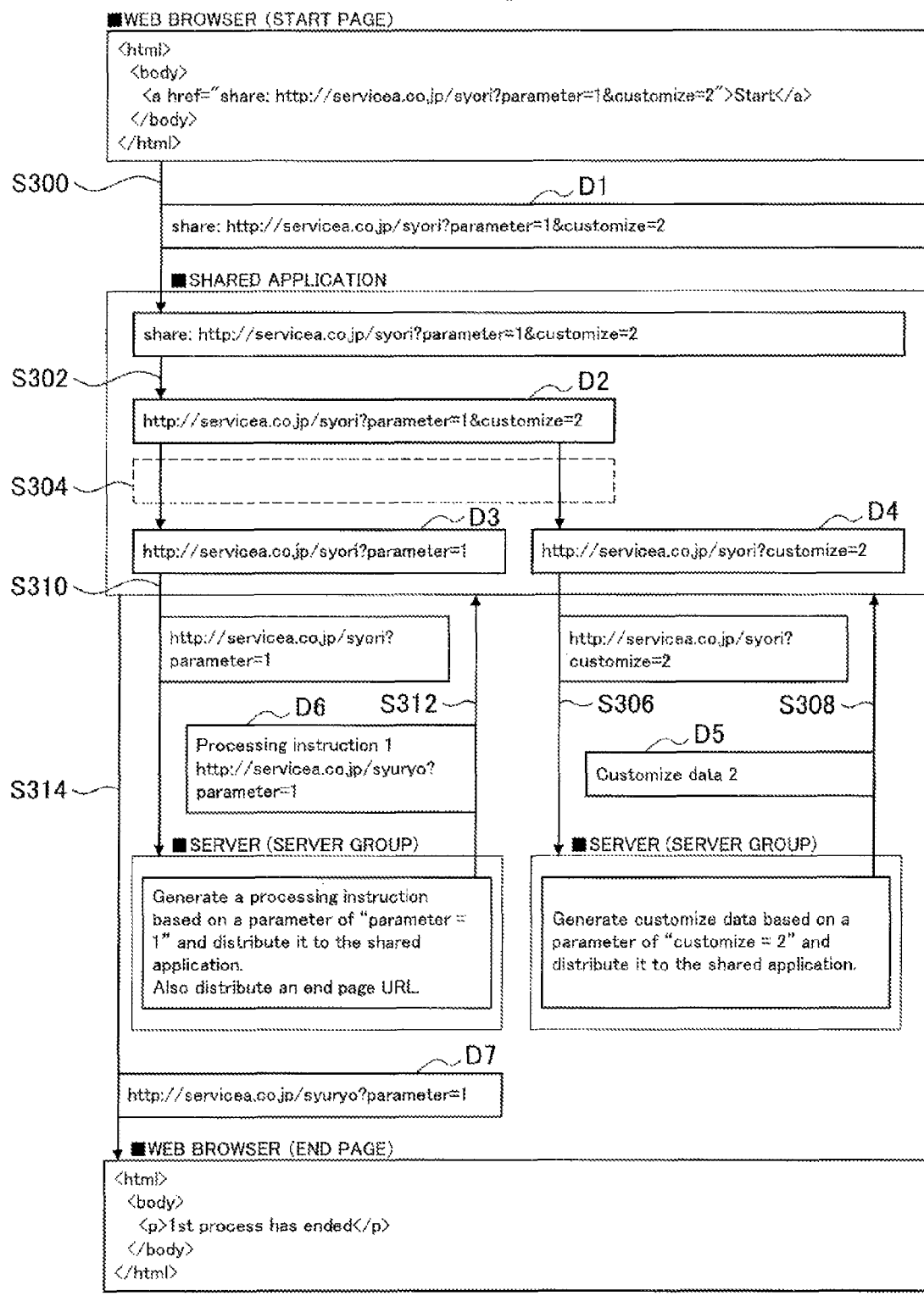
FIG. 3 is an explanatory diagram showing an example of data transfer between an information processing device and a server in a process in accordance with an information processing method in accordance with this embodiment.

FIG. 3 is an explanatory diagram showing an example of data transfer between the information processing device 100 and a server in a process in accordance with the information processing method in accordance with this embodiment. Herein, although FIG. 3 basically shows an example of data transfer performed in the process described with reference to FIG. 2, an example shown herein for descriptive purposes is a case where the information processing device 100 acquires customize data from the server 200.

The Web browser delivers the process-related information to the shared application (S300). D1 shown in FIG. 3 shows an example of the process-related information. Herein, the process of step S300 corresponds to the process of step S202 in FIG. 2.

The shared application that has received the process-related information in step S300 deletes the scheme name "share" as shown in D2 in FIG. 3 (S302). In addition, the shared application separates the information into a processing instruction distribution URL (D3 shown in FIG. 3) and a customize data distribution URL (D4 shown in FIG. 3, an example of a customize instruction) based on the URL shown in D2 in FIG. 3 (S304).

The shared application transmits a transmission request to a server indicated by the customize data distribution URL to transmit customize data (S306). Herein, the process of step S306 corresponds to the process of step S206 in FIG. 2.

The server, which has received the transmission request, transmits customize data (D5 shown in FIG. 3) corresponding a parameter included in the transmission request to the shared application (S308). Herein, the server may generate customize data based on the parameter included in the transmission request and transmit the generated customize data each time the server receives the transmission request, or transmit customize data stored in advance. The process of step S308 corresponds to the process of step S208 in FIG. 2.

In addition, the shared application requests a server indicated by the processing instruction distribution URL to transmit a processing instruction (S310). Herein, the process of step S310 corresponds to the process of step S212 in FIG. 2.

The server, which has received the request transmitted in step S310, generates a processing instruction corresponding to a parameter included in the request and transmits the generated processing instruction to the shared application (S312). The data transmitted by the server in step S312 may include a URL designating an end page as shown in D6 in FIG. 3, for example. Herein, the process of step S312 corresponds to the process of step S214 in FIG. 2.

The shared application, which has performed a process based on the customize data acquired in step S308 and the processing instruction acquired in step S312, transmits a processing result (D7 shown in FIG. 3) to the server via the Web browser (S314). Herein, the process of step S314 corresponds to the processes of steps S218 and 220 in FIG. 2.

When data is transferred between the information processing device 100 and the server as shown in FIG. 3, for example, a process in accordance with the information processing method in accordance with this embodiment shown in FIG. 2 is implemented.

Figure 4:
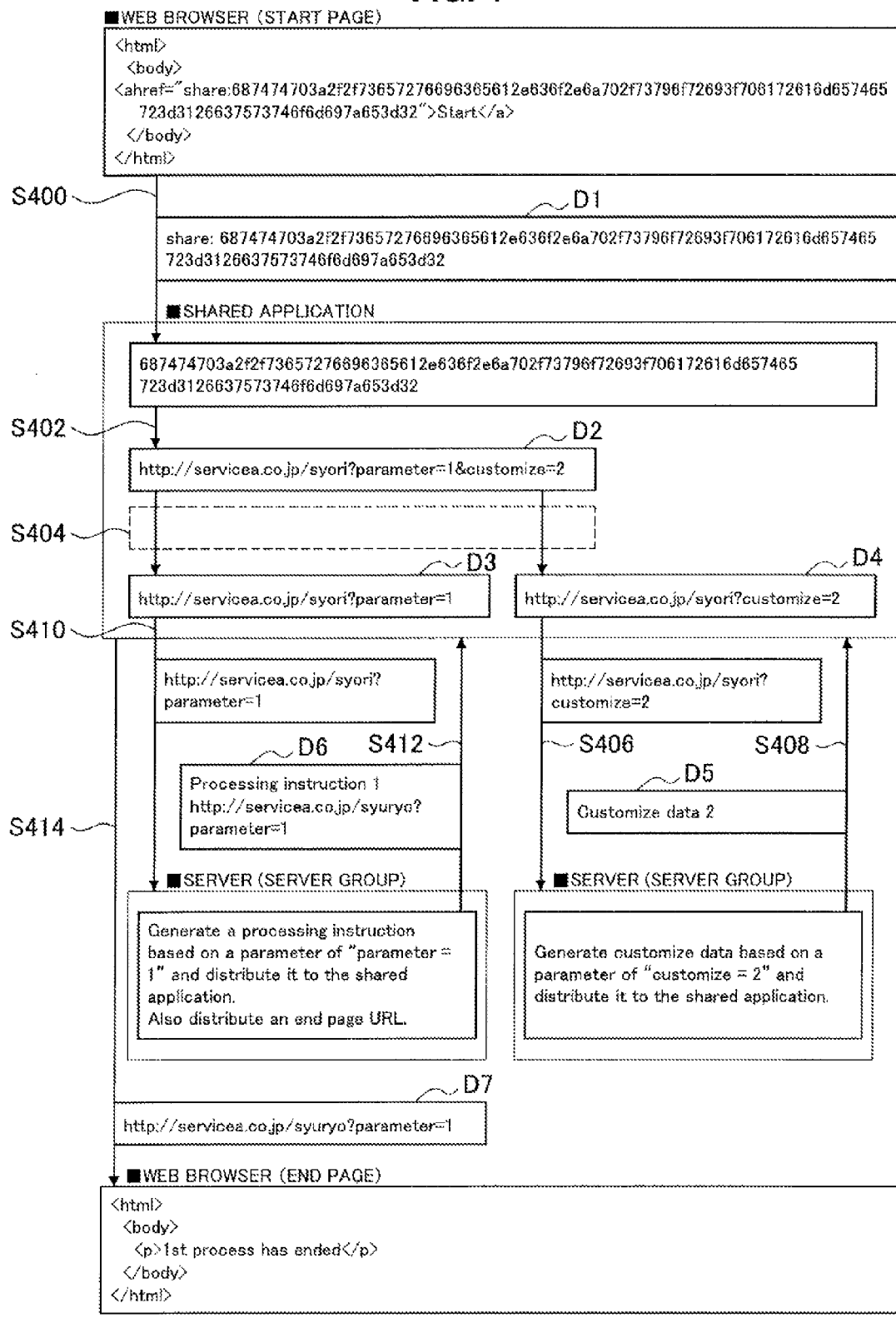
FIG. 4 is an explanatory diagram showing another example of data transfer between an information processing device and a server in a process in accordance with an information processing method in accordance with this embodiment.

Note that in the information processing system in accordance with this embodiment, data that is transferred between the information processing device 100 and the server is not limited to the example shown in FIG. 3. FIG. 4 is an explanatory diagram showing another example of data transfer between the information processing device 100 and a server in a process in accordance with the information processing method in accordance with this embodiment. Herein, FIG. 4 shows a case where data that is similar to the data in FIG. 3 is transferred between the information processing device 100 and a server.

The Web browser delivers the process-related information to the shared application as in step S300 in FIG. 3 (S400). Herein, D1 shown in FIG. 4 is data obtained by encoding the data following the scheme name "share" in D1 shown in FIG. 3 as hexadecimal numbers, and shows an example of the process-related information. For example, as in D1 shown in FIG. 4, encoding the URL portion of the D1 shown in FIG. 3 can avoid the existence of two scheme names ("share" and "http") as in D1 shown in FIG. 3, for example.

The shared application, which has received the process-related information in step S400, deletes the scheme name "share," and decodes the data as hexadecimal numbers as shown in D1 in FIG. 4 (S402). In addition, the shared application, based on the URL shown in D2 in FIG. 4, separates the data into a processing instruction distribution URL (D3 shown in FIG. 4) and a customize data distribution URL (D4 shown in FIG. 4, an example of a customize instruction) as in step S304 in FIG. 3 (S404).

In the example shown in FIG. 4, a part of the process-related information is encoded as hexadecimal numbers. However, as the processes of steps S400 to S404 are performed in the information processing device 100, for example, a state that is identical to the state in which the process of step S304 in FIG. 3 is performed is realized. Thus, in the information processing system, processes that are identical to the processes of steps S306 to S314 shown in FIG. 3 are performed as the processes of steps S406 to S414, whereby a process in accordance with the information processing method in accordance with this embodiment such as the one shown in FIG. 2 is realized.

It is needless to mention that in the information processing system in accordance with this embodiment, data that is transferred between the information processing device 100 and the server is not limited to the examples shown in FIGS. 3 and 4.

[III] Third Example

Figure 5:
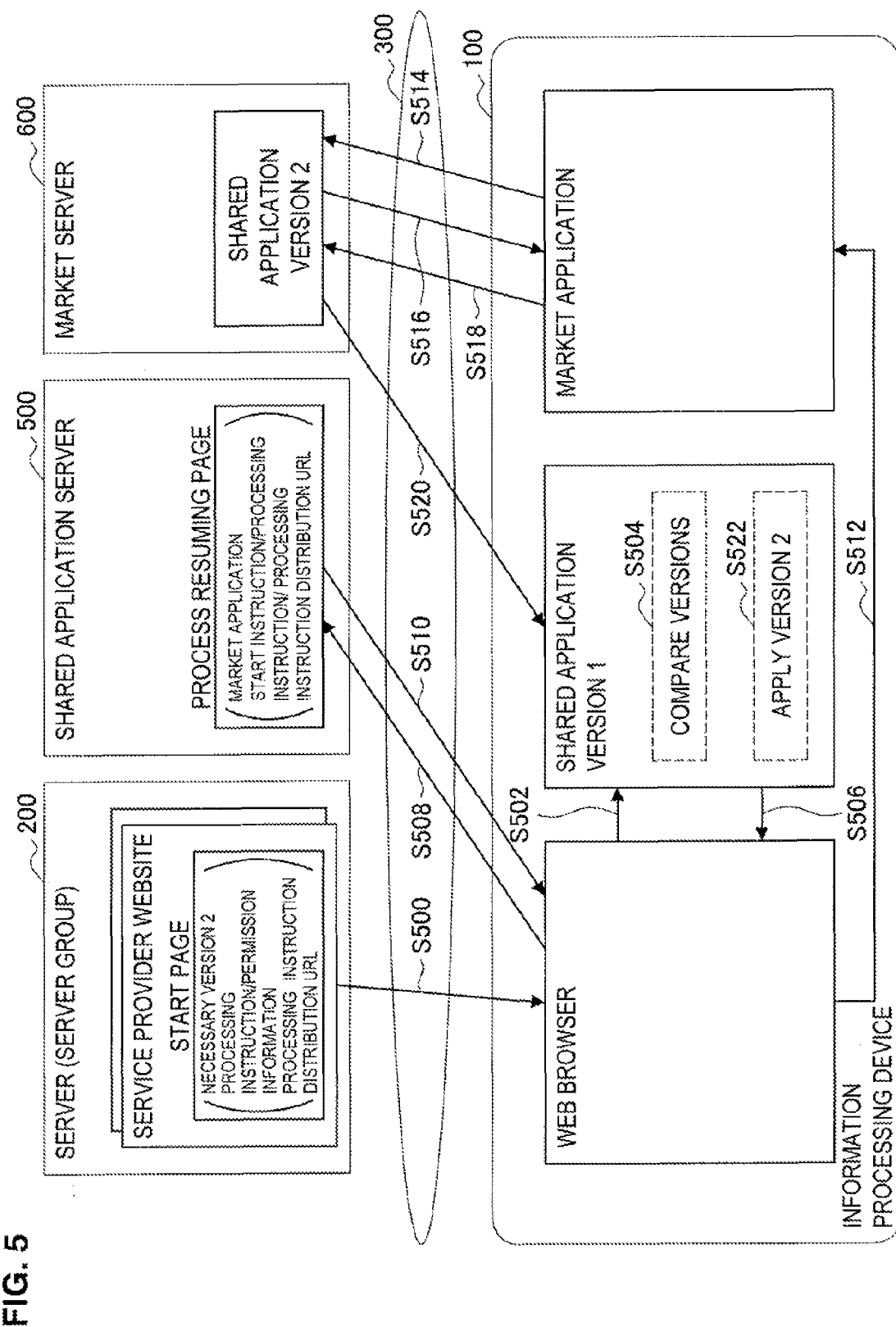
FIG. 5 is an explanatory diagram showing a third example of a process in accordance with an information processing method in accordance with this embodiment.

FIG. 5 is an explanatory diagram showing a third example of a process in accordance with the information processing method in accordance with this embodiment. Herein, FIG. 5 shows an example of a process performed when the shared application is updated based on the process-related information acquired via a service provider Website. In addition, FIG. 5 also shows an information processing system including an information processing device, 100, a server 200 connected thereto via a network 300, a shared application server 500, and a market server 600.

The information processing device 100 displays, with a Web browser, for example, a start page for a process related to a service of a service provider Website A. Herein, the start page is provided with, for example, a link as a trigger for the server 200 to transmit process-related information to an external device such as the information processing device 100. As in step S100 in FIG. 1, when a user clicks the link by operating the information processing device 100, for example, the server 200 transmits process-related information to the information processing device 100 (S500).

Herein, the process-related information transmitted in step S200 includes at least a processing instruction or a processing instruction distribution URL (an example of the identifying information), and the value of the necessary version ("2" is shown in the example shown in FIG. 5; an example of the condition information). In addition, the value of the necessary version is a value that is provided for a service provider to designate the version of the shared application, and is provided as appropriate by the service provider.

The information processing device 100, which has received the process-related information transmitted from the server 200 in step S500, delivers the process-related information from the Web browser to the shared application as in step S102 in FIG. 1 (S502).

The information processing device 100, as the process-related information includes the value of the necessary version, causes the shared application to compare the value of the current version with the value of the necessary version included in the process-related information (S504). In the example of FIG. 5, the value "1" of the current version is smaller than the value "2" of the necessary version included in the process-related information. Thus, it is determined that the version of the shared application should be updated as a result of the process of step S504. Herein, the process of step S504 corresponds to the process of (1) (the determination process).

Although FIG. 5 shows an example in which the information processing device 100 determines if the version of the shared application should be updated when the process-related information acquired from the server 200 includes the value of the necessary version (an example of the condition information), the process of the information processing device 100 in accordance with this embodiment is not limited thereto. For example, the information processing device 100 in accordance with this embodiment may determine if the shared application should be updated each time process-related information is acquired. More specifically, the information processing device 100 transmits to a pre-defined server a transmission request requesting transmission of the value of the latest version of the shared application or a transmission request requesting transmission of the value of the version of the shared application that is necessary to execute a process related to a service corresponding to the acquired process-related information, for example. Then, the information processing device 100, by performing the process of step S504 based on the value of the version transmitted from the server in response to the transmission request and the value of the current version, determines if the shared application should be updated.

In the information processing system in accordance with this embodiment, the necessary version may also be designated on the shared application server 500 side. Designation of the necessary version with the shared application server 500 is performed by an administrator who manages the shared application, for example. In such a case, the information processing device 100, with the shared application, checks the necessary version with the shared application server 500, for example. Herein, although the information processing device 100 checks the necessary version each time the shared application is started, for example, the timing of checking the necessary version in accordance with this embodiment is not limited thereto. For example, the information processing device 100 may check the necessary version each time the shared application is started a predetermined number of times (for example, once a plurality of times) or check the necessary version when the shared application is started after the elapse of a predetermined days from when the necessary version is checked the last (for example, once several days).

Further, in the information processing system in accordance with this embodiment, a process of comparing the value of the current version of the shared application with the value of the necessary version may be performed on the side of a server such as the shared application server 500. When a comparison process is performed on the server side, the information processing device 100 determines if the shared application should be updated based on the result of the comparison process performed by the server.

If it is not determined that the share application should be updated as a result of the process of step S504, the information processing device 100 performs a process based on the acquired process-related information by performing the process of from step S104 in FIG. 1 or the process of from step S204 in FIG. 2.

Meanwhile, if it is determined that the shared application should be updated as a result of the process of step S504, the information processing device 100 delivers a processing instruction or a processing instruction distribution URL included in the process-related information acquired from the server 200, and a process resuming page creation instruction to the Web browser in the form of a URL parameter (S506). Herein, examples of the method of delivering a URL parameter in step S506 include methods such as intent and object tag.

The information processing device 100 transmits the URL parameter delivered in step S506 via the Web browser to the shared application server 500 (S508). Although FIG. 5 shows an example in which the information processing device 100 transmits a URL parameter to the shared application server 500, an external device to which the information processing device 100 transmits a URL parameter is not limited to the shared application server 500. For example, the information processing device 100 may transmit a URL parameter to the server 200 that corresponds to a service whose process is interrupted.

The shared application server 500, which has received the URL parameter transmitted through the process of step S508, dynamically creates a process resuming page (Web page) for resuming a process related to a service, which has been interrupted due to the updating process for the shared application, after the completion of the updating process, using the URL parameter. Then, the information processing device 100 displays the process resuming page with the Web browser, for example (S510).

Herein, the shared application server 500 embeds into the process resuming page a starting instruction for starting a predetermined application for acquiring from a predetermined server update data for updating the version of the shared application, for example. When a starting instruction is embedded in the process resuming page as described above, the information processing device 100 can start an application corresponding to the starting instruction and acquire update date from a predetermined server. FIG. 5 shows an example in which the shared application 500 embeds a market application starting instruction for starting a market application into the process resuming page.

Note that FIG. 5 shows an example in which the information processing device 100 displays a process resuming page through the processes of steps S508 and S510 before the completion of the updating process for the shared application. This is because, there may be cases in which, depending on the aspect of the information processing system, the display and non-display of a Web page displayed by a Web browser are performed in the so-called FILO (First In Last Out) format.

Figure 6:
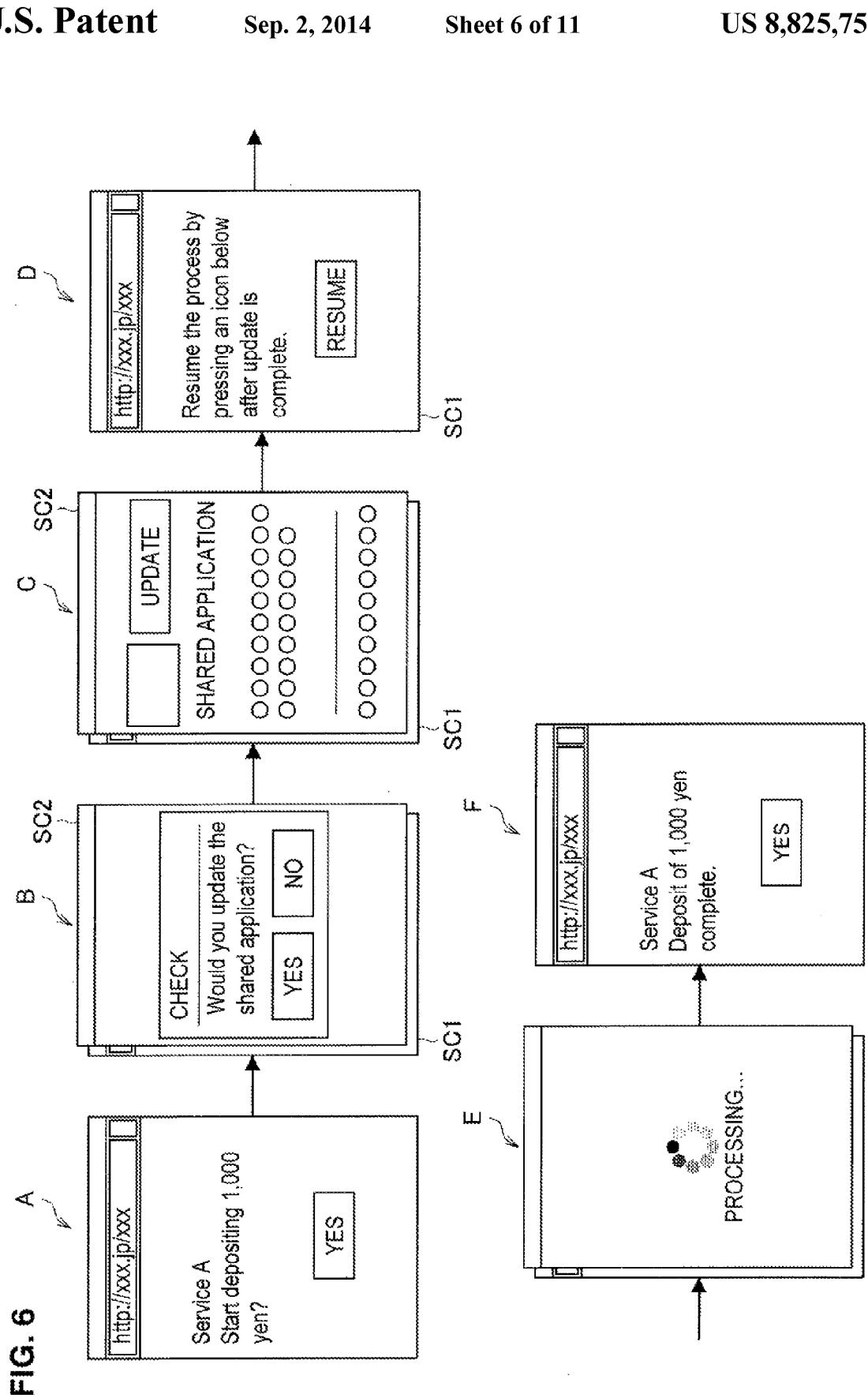
FIG. 6 is an explanatory diagram for supplementing an example of a process in accordance with an information processing method in accordance with this embodiment.

FIG. 6 is an explanatory diagram for supplementing an example of a process in accordance with the information processing method in accordance with this embodiment. Herein, FIG. 6 shows the results of the third example of a process in accordance with the information processing method in accordance with this embodiment and a fourth example of a process in accordance with the information processing method in accordance with this embodiment described below, and an example of a screen displayed on the display screen.

In the screen shown in A in FIG. 6, for example, when a "YES" button is selected, a process related to a service A is started in the information processing device 100. Herein, the screen shown in A in FIG. 6 corresponds to a screen displayed for the process of step S500 in FIG. 5, for example.

When it is determined that the shared application should be updated, a screen SC2 related to an updating process for the shared application is displayed in a manner overlapping a screen SC1 related to the interrupted service A as shown in B in FIG. 6, for example. Herein, the screen shown in B in FIG. 6 corresponds to a screen displayed on the display screen for the process of step S504 in FIG. 5, for example. Note that FIG. 6 represents the screen SC1 and the screen SC2 in a manner displaced from each other for descriptive purposes.

When a "YES" button is selected on the screen SC2 shown in B in FIG. 6, for example, the information processing device 100 starts an updating process for the shared application (C shown in FIG. 6). Herein, the screen shown in C in FIG. 6 corresponds to a screen displayed through the process of step S516 in FIG. 5, for example. Then, when the updating process for the shared application is complete, the screen SC2 related to the updating process for the shared application is put into a non-display state (D shown in FIG. 6).

As described above, when the display and non-display of a Web page displayed by a Web browser are performed in the so-called FILO format, it is desirable that a process resuming page be displayed on the display screen as shown in D in FIG. 6 when the screen SC2 related to the updating process for the shared application is put into a non-display state. This is because when a process resuming page is not displayed on the display screen after the completion of the updating process for the shared application, there is a possibility that the convenience for the user may be degraded such that the user should access the start page for the service A again, for example. Further, if the convenience for the user is degraded, there is also a possibility that the use rate of the service may decrease due to the service not being resumed.

When a process resuming page is displayed on the display screen after the completion of the updating process for the shared application as shown in D in FIG. 6, for example, it is possible to resume and complete the process related to the service A (E and F shown in FIG. 6) by a selecting a "RESUME" button.

As described above, when a process resuming page is not displayed on the display screen after the completion of the updating process for the shared application, there is a possibility that the convenience for the user may be degraded. Herein, FIG. 5 shows an example of a process for, when the display and non-display of a Web page displayed by a Web browser are performed in the so-called FILO format as shown in FIG. 6, preventing a decrease in the convenience for the user and a decrease in the use rate of the service. Note that when the display and non-display of a Web page displayed by a Web browser are not performed in the so-called FILO format as shown in FIG. 6, the information processing system in accordance with this embodiment may, after the completion of the updating process for the shared application, perform the process of step S508 or the process of S510 in FIG. 5, for example.

Figure 7:
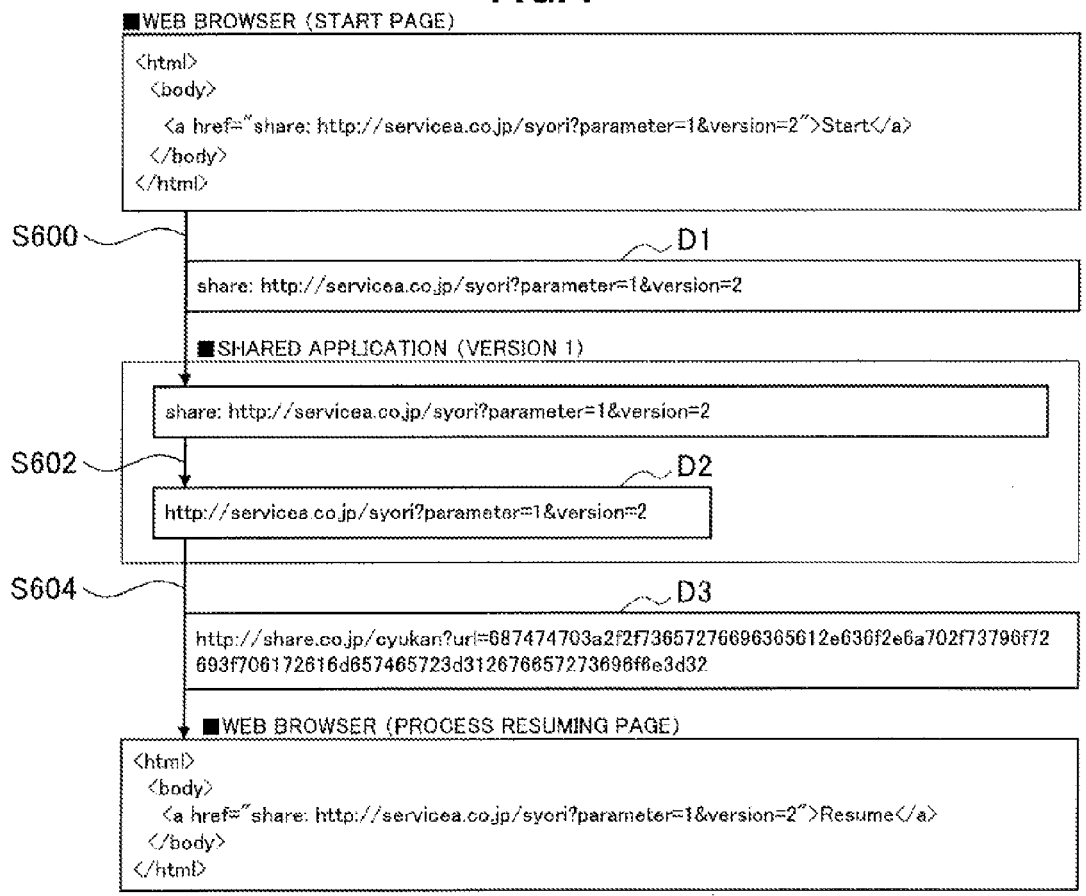
FIG. 7 is an explanatory diagram showing an example of data transfer related to the display of a process resuming page on a display screen in a process in accordance with an information processing method in accordance with this embodiment.

Herein, a specific example of data transfer related to the display of a process resuming page on the display screen in a process in accordance with the information processing method in accordance with this embodiment will be described. FIG. 7 is an explanatory diagram showing an example of data transfer related to the display of a process resuming page on the display screen in a process in accordance with the information processing method in accordance with this embodiment.

The Web browser delivers the process-related information to the shared application (S600). D1 shown in FIG. 7 shows an example of the process-related information. Herein, the process of step S600 corresponds to the process of step S502 in FIG. 5.

The shared application, which has received the process-related information in step S600, deletes the scheme name "share" as shown in D2 in FIG. 7 (S602). In addition, the shared application compares the value of the current version with the value of the necessary version included in the process-related information. In the example of FIG. 7, the shared application compares the value "1" of the current version with the value "2" of the necessary version included in the process-related information, and determines that update is necessary.

The shared application, for example, encodes the URL parameter shown in D2 in FIG. 7 as hexadecimal numbers, and transmits the encoded URL parameter (D3 shown in FIG. 7) to a server via the Web browser (S604). Herein, the process of step S604 corresponds to the processes of steps S506 and S508 in FIG. 5.

When data is transferred as shown in FIG. 7, for example, display of a process resuming page on the display screen is realized.

Figure 8:
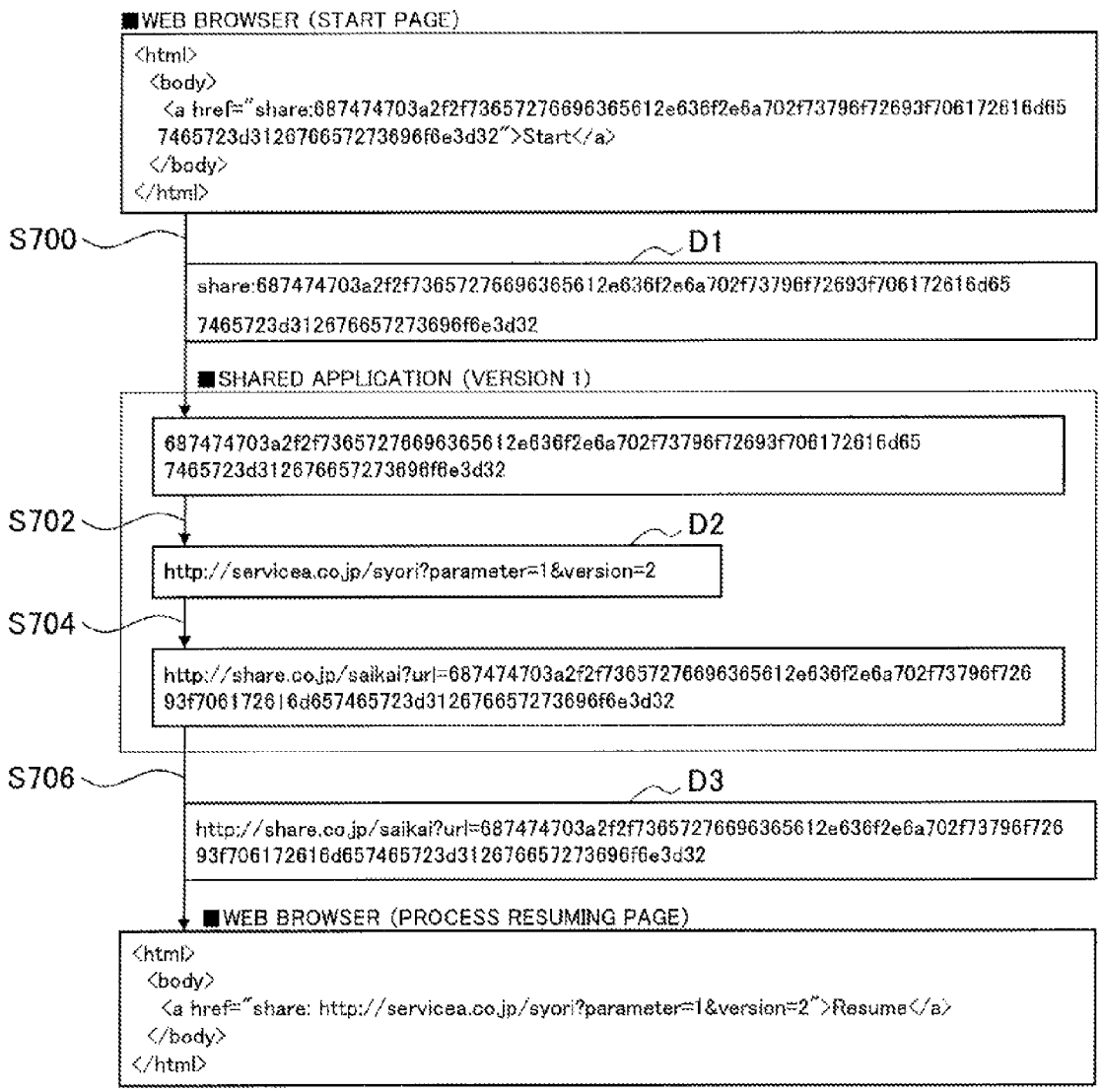
FIG. 8 is an explanatory diagram showing another example of data transfer related to the display of a process resuming page on a display screen in a process in accordance with an information processing method in accordance with this embodiment.

Note that the data transfer related to the display of a process resuming page on the display screen in the information processing system in accordance with this embodiment is not limited to the example shown in FIG. 7. FIG. 8 is an explanatory diagram showing another example of data transfer related to the display of a process resuming page on the display screen in a process in accordance with the information processing method in accordance with this embodiment. Herein, FIG. 8 shows a case where data similar to that in FIG. 7 is transferred between the information processing device 100 and a server.

The web browser delivers the process-related information to the shared application as in step S600 in FIG. 7 (S700). Herein, D1 shown in FIG. 8 is data obtained by encoding the data following the scheme name "share" in the D1 shown in FIG. 7 as hexadecimal numbers, and shows an example of the process-related information.

The shared application, which has received the process-related information in step S700 deletes the scheme name "share," and decodes the data as hexadecimal numbers shown in D2 in FIG. 8 (S702). In addition, the shared application compares the value of the current version with the value of the necessary version included in the process-related information. In the example of FIG. 8, the shared application compares the value "1" of the current version with the value "2" of the necessary version included in the process-related information, and determines that update is necessary.

The shared application, for example, encodes the URL parameter shown in D2 in FIG. 8 as hexadecimal numbers (S704) and transmits the encoded URL parameter (D3 shown in FIG. 8) to a server via the Web browser (S706). Herein, the process of step S706 corresponds to the processes of steps S506 and 508 in FIG. 5.

When data is transferred as shown in FIG. 8, for example, display of a process resuming page on the display screen is realized. Note that it is needless to mention that the data transfer related to the display of a process resuming page on the display screen in the information processing system in accordance with this embodiment is not to the examples shown in FIGS. 7 and 8.

Hereinafter, significance of transferring data related to the display of a process resuming page on the display screen as shown in FIGS. 7 and 8, for example, will be described. Examples of a method of, after updating the shared application, resuming a process related to a service using a parameter received via a service provider Website include the three following methods (a) to (c).

(a) Storing a parameter in the information processing device before the shared application is updated, and resuming a process related to a service using the stored parameter upon starting the shared application after the update.

(b) Keeping a start page of a service provider Website as it is, and causing the information processing device to, after the shared application is updated, execute a process related to a service again by operating the start page of the service provider Website by the user.

(c) Creating a process resuming page, and causing the information processing device to, after the shared application is updated, execute a process related to a service again by operating the process resuming page by the user (the aforementioned method in accordance with this embodiment).

When the method of (a) is used, for example, it becomes further necessary to perform a process of determining a process related to a service to be executed in the information processing device. For example, when a parameter that is stored before the shared application is updated is a parameter corresponding a service provider A, and the shared application is started from a start page of a service provider B after the update, the information processing device should determine which of the process of the service provider A and the process of the service provider B should be executed or determine if both the processes should be performed.

Herein, if an error occurs in the determination result, it follows that a process related to a service that is not intended by the user will be executed. Accordingly, when the method of (a) is used, for example, there is a possibility that the convenience for the user may be degraded.

Meanwhile, when the method of (b) is used, for example, it is necessary to, after the shared application is updated, cause the information processing device to execute a process related to a service again by operating a start page of the service provider Website by the user. Therefore, when the process related to the service is a process of depositing electronic money (an example of an electronic value) of 1000 yen, there may be cases where the user be reluctant to perform the operation again. This is because there is a possibility that the user may interpret that "2000 yen may be deposited (the process related to the service may be performed doubly)."

Accordingly, when the method of (b) is used, for example, as the user should access a start page for a service again, the convenience for the user can decrease and the use ratio of the service can also decrease as described above.

Meanwhile, when the method of (c) in accordance with this embodiment is used, problems associated with (a) and (b) do not occur. That is, using the method of (c) in accordance with this embodiment can solve the problems associated with (a) and (b).

Herein, when the shared application is updated in the information processing device 100, the shared application itself is updated. Thus, it is difficult for the shared application to perform a process related to creation of a process resuming page. Thus, in the information processing system in accordance with this embodiment, a server (e.g., the shared application server 500), which is an external device of the information processing device 100, is caused to create a process resuming page.

For example, as shown in FIGS. 7 and 8, when a parameter acquired through a start page for a service is delivered from the information processing device 100 to a server, it is possible to implement the method of (c) in accordance with this embodiment that can solve the problems associated with (a) and (b).

Referring again to FIG. 5, a third example of a process in accordance with the information processing method in accordance with this embodiment will be described. When a process resuming page is displayed in step S510, the information processing device 100 starts a market application based on an instruction to start a market application that is embedded in the process resuming page (S512). Herein, step S512 is performed by, for example, delivering a URL parameter that defines a URL of a server storing update information and a processing parameter. Examples of the method of delivering a URL parameter include methods such as intent and object tag.

Although FIG. 5 shows an example in which the information processing device 100 starts a market application via the Web browser, the process of the information processing device 100 is not limited thereto. For example, the information processing device 100 may start a market application via the shared application.

The information processing device 100 requests the market server 600 to transmit information on the latest version of the shared application, for example, via the market application (S514). Note that information on the version of the shared application that the information processing device 100 requests the market server 600 to transmit is not limited to the information on the latest version, and may be, for example, information on the version of the shared application corresponding to the value of the necessary version (an example of the condition information) included in the process-related information. In addition, it is needless to mention that in the information processing system in accordance with this embodiment, a device that stores the update data is not limited to the market server 600.

The market server 600, which has received the request transmitted in step S514, transmits information on the version of the shared application corresponding to the request to the information processing device 100 (S516). Through the process of step S516, a screen shown in SC2 of C in FIG. 6 is displayed on the display screen, for example.

For example, when an "UPDATE" button is selected in the screen shown in SC2 of C in FIG. 6, the information processing device 100 transmits an update information transmission request (i.e., a request to update the shared application) to the market server 600 via the market application (S518).

The market server 600, which has received the update information transmission request transmitted in step S518, transmits update information to the information processing device 100 in response to the transmission request (S520).

The information processing device 100, which has received the update information transmitted in step S520, updates the shared application using the received update information (S522). In addition, when the process of step S522 is performed, the information processing device 100 performs a process in accordance with a fourth example of the information processing method in accordance with this embodiment described below, for example.

Herein, the process of step S506, the process of step S508, the process of step S512, the process of step S514, the process of step S518, and the process of step S522 in the information processing device 100 correspond to the process of (2) (the execution control process), for example.

When the process shown in FIG. 5 is performed, for example, the information processing device 100 can, based on the process-related information acquired via the service provider Website, update the shared application. Note that it is needless to mention that the process related to the update of the shared application that is performed based on the acquired process-related information in the information processing system in accordance with this embodiment is not limited to the example shown in FIG. 5.

[IV] Fourth Example

Figure 9:
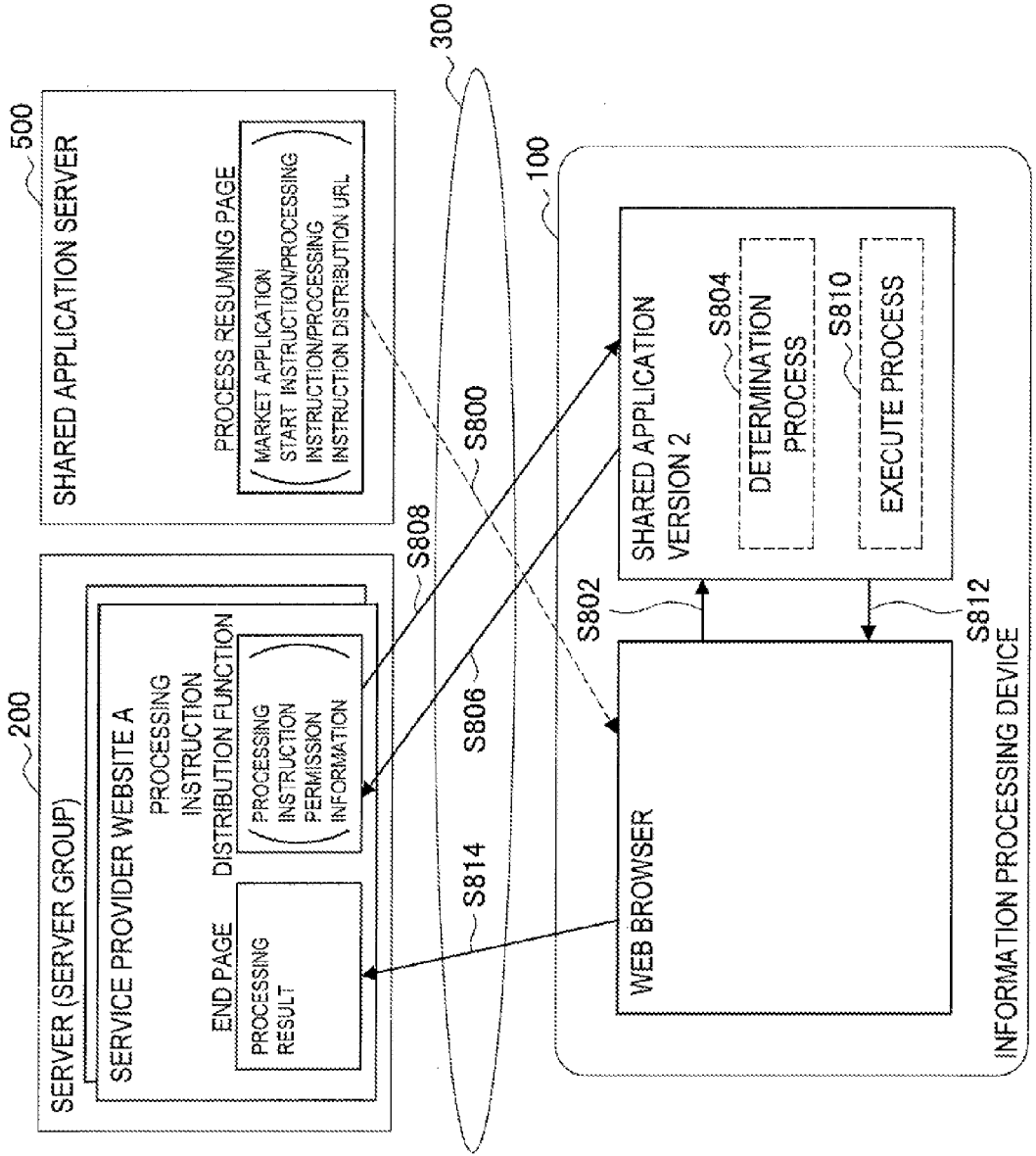
FIG. 9 is an explanatory diagram showing a fourth example of a process in accordance with an information processing method in accordance with this embodiment.

FIG. 9 is an explanatory diagram showing a fourth example of a process in accordance with the information processing method in accordance with this embodiment. Herein, FIG. 9 shows an example of a process performed when an interrupted process related to a service is resumed after the shared application is updated in the process in accordance with the aforementioned third example. In addition, FIG. 9 shows an information processing device 100, a server 200 connected thereto via a network 300, and a shared application server 500.

The information processing device 100 displays a process resuming page dynamically created by the shared application server 500, using a Web browser, for example (S800). Herein, the process of step S800 corresponds to the process of step S510 in FIG. 5. When update of the shared application in the process in accordance with the aforementioned third example is complete, a screen shown in D in FIG. 6 is displayed, for example.

When a "RESUME" button shown in D in FIG. 6 is selected, for example, the information processing device 100 delivers a URL parameter associated with the selected button (which corresponds to the URL parameter transmitted by the information processing device 100 in step S508 in FIG. 5) from the Web browser to the shared application (S802). Examples of the method of delivering a URL parameter in step S802 include methods such as intent and object tag.

The information processing device 100 determines if a process related to a service can be performed with the shared application using a URL parameter (e.g., a URL parameter that is based on the process-related information, acquired in step S500 in FIG. 5) (S804). Herein, the process of step S804 corresponds to the process of (1) (the determination process).

More specifically, the information processing device 100, if the URL parameter includes a processing instruction distribution URL, for example, does not determine that a process related to a service can be performed using the URL parameter, and performs a process of step S806 described below. Meanwhile, the information processing device 100, if the URL parameter includes a processing instruction, for example, does not perform the process of step S806 described below, and performs a process of step S810 described below.

If it is not determined that a process related to a service can be performed in step S804, the information processing device 100 requests the server 200 to transmit a processing instruction (or a processing instruction and permission information) as in step S106 in FIG. 1 (S806). Herein, the process of step S806 corresponds to the process of (2) (the execution control process).

The server 200, which has received the request transmitted from the information processing device 100 in step S806, generates a processing instruction corresponding to the request as in step S108 in FIG. 1, and transmits the processing instruction to the information processing device 100 (S808). Note that the server 200 may further transmit permission information in step S808.

If it is determined that the URL parameter includes a processing instruction in step S804, or if a processing instruction is received in step S808, the information processing device 100 performs a process corresponding to the processing instruction with the shared application (S810). Herein, the process of step S810 corresponds to the process of (3) (the execution process).

The information processing device 100, which has performed the process of step S810, delivers the processing result from the shared application to the Web browser as in step S118 in FIG. 1 (S812). Then, the information processing device 100 transmits a URL parameter (an example of the processing result) to the server 200 via the Web browser (S814).

The server 200, which has received the URL parameter transmitted through the process of step S814, dynamically creates an end page (Web page) indicating the end of the process related to the service using the URL parameter. Then, the information processing device 100 displays, with the Web browser, for example, the end page indicating the end of the process related to the service of the service provider Website A.

In the information processing system in accordance with this embodiment, when a process related to a service, which has been interrupted by an updating process for the shared application (e.g., a process in accordance with the aforementioned third example), is resumed, the process shown in FIG. 9 is performed, for example. Herein, the process of from step S804 shown in FIG. 9 is similar to the process of from step S104 shown in FIG. 1. Accordingly, through the process shown in FIG. 9, for example, the information processing device 100 can terminate the process related to the service (a process that is based on the acquired process-related information) after the updating process for the shared application.

Note that the method of resuming an interrupted process related to a service after the update of the shared application in the information processing system in accordance with this embodiment is not limited to the aforementioned example. For example, it is also possible for the information processing device 100 to, before starting the updating process for the shared application, record the acquired process-related information on a recording medium, and after the termination of the updating process for the shared application, perform a process by reading the process-related information from the recording medium.

When the process in accordance with the first example to the process in accordance with the fourth example described above are performed, for example, a process in accordance with the information processing method in accordance with this embodiment is realized. Note that it is needless to mention that the example of the process in accordance with the information processing method in accordance with this embodiment is not limited to the process in accordance with the first example to the process in accordance with the fourth example described above.

(Information Processing Device in Accordance with this Embodiment)

Next, an exemplary configuration of the information processing device 100 in accordance with this embodiment that can perform a process in accordance with the aforementioned information processing method in accordance with this embodiment will be described.

Figure 10:
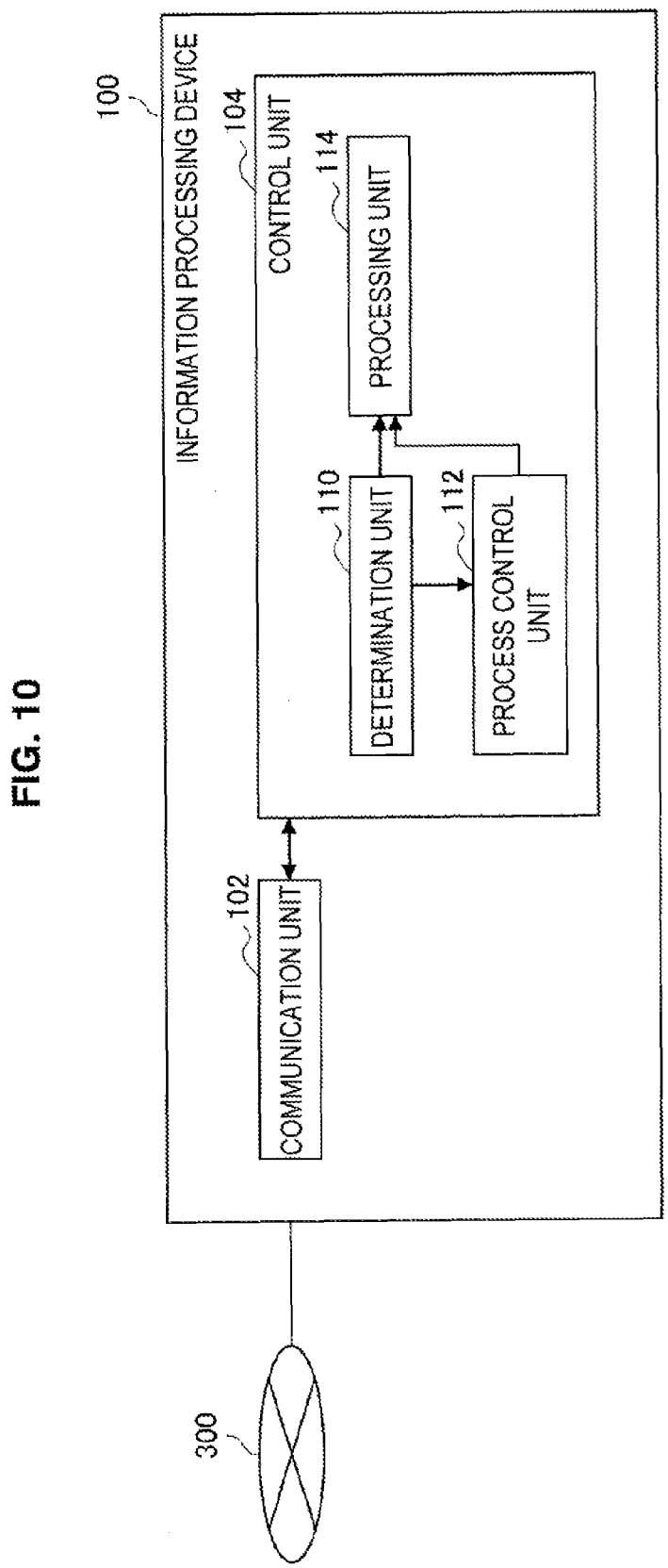
FIG. 10 is a block diagram showing an exemplary configuration of an information processing device in accordance with this embodiment.

FIG. 10 is a block diagram showing an exemplary configuration of the information processing device 100 in accordance with this embodiment. The information processing device 100 includes a communication unit 102 and a control unit 104, for example.

In addition, the information processing device 100 may also include, for example, ROM (Read Only Memory; not shown), RAM (Random Access Memory; not shown), a storage unit (not shown), an operation unit that can be operated by a user (not shown), and a display unit (not shown) that displays various screens on the display screen. The information processing device 100, for example, connects each of the aforementioned components via a bus serving as a data transmission channel.

Herein, the ROM (not shown) stores programs used by the control unit 104 and control data such as operation parameters. The RAM (not shown) temporarily stores programs executed by the control unit 104.

The storage unit (not shown) is a storage means of the information processing device 100, and stores various data such as electronic money, service-related data like data for receiving privileges associated with a service, or applications. Herein, examples of the storage unit (not shown) include a magnetic recording medium such as a hard disk, and nonvolatile memory such as EEPROM (Electrically Erasable and Programmable Read Only Memory) or flash memory. Alternatively, the storage unit (not shown) may be a tamper-resistant recording medium provided in an IC chip that can communicate wirelessly with a reader/writer, for example. In addition, the storage unit (not shown) may be removable from the information processing device 100.

Examples of the operation unit (not shown) include a button, a direction key, a rotary selector such as a jog dial, and a combination thereof. In addition, the information processing device 100 can connect to an operation input device (e.g., a keyboard or a mouse) as an external device of the information processing device 100.

Examples of the display unit (not shown) include a liquid crystal display (LCD) and an organic EL display (also referred to as an organic ElectroLuminescence display or an OLED display (Organic Light Emitting Diode display)). Alternatively, the display unit (not shown) may be a device that can display information and can be operated by a user such as a touch screen, for example. Further, the information processing device 100 can connect to a display device (e.g., an external display) as an external device of the information processing device 100 regardless of whether it has a display unit (not shown) or not.

[Exemplary Hardware Configuration of the Information Processing Device 100]

FIG. 11 is an explanatory diagram showing an exemplary hardware configuration of the information processing device 100 in accordance with this embodiment. The information processing device 100 includes, for example, a MPU 150, ROM 152, RAM 154, a recording medium 156, an input/output interface 158, an operation input device 160, a display device 162, and a communication interface 158. In addition, the information processing device 100 connects each of the aforementioned components via a bus 166 serving as a data transmission channel, for example.

The MPU 150 functions as, for example, a MPU (Micro Processing Unit) and a control unit 104 that includes various processing circuits and the like and controls the entire information processing device 100. In addition, the MPU 150 functions as a determination unit 110, a process control unit 112, and a processing unit 114 described below, for example, in the information processing device 100.

The ROM 152 stores programs used by the MPU 150, control data such as operation parameters, and the like. The RAM 154 temporarily stores programs executed by the MPU 150, for example.

The recording medium 156 functions as a storage unit (not shown), and stores various data such as service-related data and applications, for example. Herein, examples of the recording medium 156 include a magnetic recording medium such as a hard disk and nonvolatile memory such as flash memory. In addition, the recording medium 156 may be removable from the information processing device 100.

The input/output interface 158 connects the operation input device 160 and the display device 162, for example. The operation input device 160 functions as an operation unit (not shown), and the display device 162 functions as a display unit (not shown). Herein, examples of the input/output interface 158 include a USB (Universal Serial Bus) terminal, a DVI (Digital Visual Interface) terminal, a HDMI (High-Definition Multimedia Interface) terminal, and various processing circuits. The operation input device 160 is provided on the information processing device 100, for example, and is connected to the input/output interface 158 in the information processing device 100. Examples of the operation input device 160 include a button, a direction key, a rotary selector such as a jog dial, and a combination thereof. In addition, the display device 162 is provided on the information processing device 100, for example, and is connected to the input/output interface 158 in the information processing device 100. Examples of the display device 162 include a liquid crystal display and an organic EL display.

Note that it is needless to mention that the input/output interface 158 may also connect to an external device such as an operation input device (e.g., a keyboard or a mouse), a display device, or an imaging device as an external device of the information processing device 100. In addition, the display device 162 may be a device that can display information and can be operated by a user such as a touch screen, for example.

The communication interface 164 is a communication means of the information processing device 100, and functions as the communication unit 102 for performing wire/wireless communication with an external device such as a server like the server 200, the shared application server 500, or the market server 600, for example, via the network 300 (or directly). Herein, examples of the communication interface 164 include a communication antenna and an RF (Radio Frequency) circuit (wireless communication); an IEEE 802.15.1 port and a transmission/reception circuit (wireless communication); an IEEE 802.11b port and a transmission/reception circuit (wireless communication); and a LAN (Local Area Network) terminal and a transmission/reception circuit (wire communication).

The information processing device 100, with the configuration shown in FIG. 11, for example, performs a process in accordance with the information processing method in accordance with this embodiment. Note that the hardware configuration of the information processing device 100 in accordance with this embodiment is not limited to the configuration shown in FIG. 11.

For example, the information processing device 100 may further include a wireless communication antenna circuit and a carrier transmission circuit for communicating with an external device such as the external terminal 400 via a communication channel formed by NFC (Near Field Communication) that uses a carrier wave with a predetermined frequency such as 13.56 [MHz].

Herein, the wireless communication antenna circuit includes, for example, a resonance circuit that includes a coil having predetermined inductance as a transmission/reception antenna and a capacitor having predetermined electrostatic capacitance, and a demodulation circuit. In addition, the carrier transmission circuit includes, for example, a modulation circuit that performs ASK modulation (Amplitude Shift Keying) and an amplification circuit that amplifies the output of the modulation circuit, and transmits a carrier wave with a carrier signal superimposed thereon from the transmission/reception antenna of the wireless communication antenna circuit.

By having a wireless communication antenna circuit and a carrier transmission circuit such as those described above, for example, the information processing device 100 can have so-called reader/writer functions.

In addition, the information processing device 100 may include an IC chip that communicates wirelessly with readers/writers. By including an IC chip, the information processing device 100 can perform the process of step S110 and the process of S112 shown in FIG. 1, for example, in the process of (3) (the execution process).

In addition, the information processing device 100 may further include a DSP (Digital Signal Processor) and an audio output device including an amplifier, a speaker, and the like. When the information processing device 100 further includes the aforementioned DSP and audio output device, the information processing device 100 can implement auditory presentation to a user via sound.

Further, the information processing device 100 may also have a configuration without the operation device 160 and the display device 162.

Referring again to FIG. 10, an exemplary configuration of the information processing device 100 will be described. The communication unit 102 is a communication means of the information processing device 100, and performs wire/wireless communication with an external device such as a server via the network 300 (or directly). In addition, communication of the communication unit 102 is controlled by the control unit 104, for example. Although the communication unit 102 may be a communication antenna and an RF circuit; or a LAN terminal and a transmission/reception circuit, for example, the configuration of the communication unit 102 is not limited thereto. For example, the communication unit 102 may have a configuration supporting a given standard capable of performing communication, such as a USB terminal and a transmission/reception circuit, or a configuration supporting the network 300.

The control unit 104 includes a MPU, for example, and functions to control the entire information processing device 100. In addition, the control unit 104 includes, for example, a determination unit 110, a process control unit 112, and a processing unit 114, and plays a leading role in performing a process in accordance with the information processing method in accordance with this embodiment.

The determination unit 110 plays a leading role in performing the process of (1) (the determination process), and determines if a process based on the process-related information can be executed based on the process-related information acquired from the server (the first server) that provides a service such as the server 200.

The process control unit 112 plays a leading role in performing the process of (2) (the execution control process), and, if it is not determined that a process can be executed with the determination unit 110, makes a process based on the process-related information executable. Herein, if it is not determined that a process can be executed with the determination unit 110, the process control unit 112 causes the server (the second server) to, based on the process-related information, for example, generate a processing instruction that is based on the process-related information. When the process control unit 112 causes the server to generate a processing instruction that is based on the process-related information, the processing unit 114 can, based on the processing instruction that the process control unit 112 caused the server to generate, perform a process based on the process-related information.

The processing unit 114 plays a leading role in performing the process of (3) (the execution process), and causes the shared application to execute a process based on the process-related information.

More specifically, if the process-related information includes identifying information and a parameter defining the type of a process, for example, the determination unit 110 does not determine that a process is executable. In such case, the process control unit 112, for example, transmits a generation request including the parameter to a server indicated by the identifying information, and causes the server to generate a processing instruction corresponding to the parameter. Then, the processing unit 114 causes the shared application to execute a process indicated by the acquired processing instruction. The process herein corresponds to, for example, a process in accordance with the aforementioned first example of the information processing method in accordance with this embodiment.

Meanwhile, if the process-related information includes a processing instruction, for example, the determination unit 110 determines that a process is executable. Then, the processing unit 114 causes the shared application to execute a process based on the processing instruction. Herein, if the process-related information further includes permission information, the processing unit 114 causes the shared application to execute a process based on the processing instruction within the limit indicated by the permission information. The process herein corresponds to, for example, a process in accordance with the aforementioned first example of the information processing method in accordance with this embodiment.

In addition, if the process-related information further includes a setting instruction for changing a process to be executed, for example, the determination unit 110 does not determine that a process is executable. In such a case, the process control unit 112 causes a server indicated by the setting instruction to transmit setting data corresponding to the setting instruction. Meanwhile, the process control unit 112, if the process-related information includes identifying information and a parameter defining the type of a process, causes the server to generate a processing instruction corresponding to the parameter as described above. Then, the processing unit 114 causes the shared application to execute a process based on the acquired setting data and processing instruction. The process herein corresponds to, for example, a process in accordance with the aforementioned second example of the information processing method in accordance with this embodiment.

In addition, if the process-related information further includes condition information, for example, the determination unit 110 determines if the share application satisfies the condition indicated by the condition information. If the determination unit 110 does not determine that the shared application satisfies the condition, the process control unit 112 causes a server, which stores update data, to transmit the update data. Then, the process control unit 112 updates the shared application using the acquired update data. The process herein corresponds to a process in accordance with the aforementioned third example of the information processing method in accordance with this embodiment, for example.

In addition, if the determination unit 110 does not determine that the shared application satisfies the condition, the process control unit 112 interrupts the execution of the process of the shared application that is based on the process-related information. Then, the process control unit 112, when update of the shared application is complete, resumes the process of the shared application based on the process-related information. The process herein corresponds to a process in accordance with the aforementioned third example of the information processing method in accordance with this embodiment, for example.

The control unit 104 plays a leading role in performing a process in accordance with the information processing method in accordance with this embodiment by including the determination unit 110, the process control unit 112, and the processing unit 114 that respectively perform the aforementioned processes, for example.

The information processing device 100, with the configuration shown in FIG. 10, for example, performs processes in accordance with the information processing method in accordance with this embodiment (e.g., the process of (1) (the determination process) to the process of (3) (the execution process)). Thus, the information processing device 100 can, with the configuration shown in FIG. 10, for example, cause a shared application, which can perform processes corresponding to a plurality of services, to behave differently for each service.

As described above, the information processing device 100 in accordance with this embodiment performs the process of (1) (the determination process) to the process of (3) (the execution process) as a process in accordance with the information processing method in accordance with this embodiment. Herein, if the process of (2) (the execution control process) is not performed in the information processing device 100, the shared application executes a process based on the process-related information acquired from the server (the first server) that provides a service. Meanwhile, if the process of (2) (the execution control process) is performed in the information processing device 100, it follows that a process based on the process-related information is executable. Thus, the shared application can execute a process based on the acquired process-related information.

Thus, the information processing device 100 can cause a shared application, which can perform processes corresponding to a plurality of services, to behave differently for each service.

In addition, in the information processing system in accordance with this embodiment, (i) to (iv) described below are implemented, for example, by performing a process in accordance with the information processing method in accordance with this embodiment with the information processing device 100.

(i) A URL parameter described in a start page of a service provider Website is taken over by a shared application that is started from the service provider Website and used, whereby the shared application is caused to behave differently for each service provider.

(ii) Customizing of the shared application is requested by a URL parameter from a service provider Website. In addition, the shared application instructs the server to dynamically generate customize data using the URL parameter, whereby the shared application operates by applying customize data for each service provider.

(iii) A version of the shared application that is necessary for execution of a process is indicated by a URL parameter from a service provider Website. In addition, if the version of the shared application does not meet the version of the shared application that is necessary for execution of a process, the shared application is guided to be updated.

When (iii) above is implemented, for example, the service provider can generate a processing instruction for the shared application based on the premise that a specific version of the shared application resides in the information processing device 100.

(iv) After the shared application is updated, a process resuming page for resuming a process related to a service is displayed.

When (iv) above is implemented, for example, it becomes easier for the user to resume a process related to a service. Thus, it is possible to prevent a decrease in the convenience for the user and a decrease of the use rate of the service.

Although the information processing device 100 has been described above as an element of the information processing system in accordance with this embodiment, this embodiment is not limited thereto. This embodiment can be applied to various devices such as, for example, a communication device like a portable phone or a smartphone, a video/music reproducing device (or a video/music recording/reproducing device), a game machine, or a computer like a PC (Personal Computer).

In addition, although the server 200, the shared application server 500, and the market server 600 have been described as other elements of the information processing system in accordance with this embodiment, this embodiment is not limited thereto. This embodiment can be applied to various devices such as, for example, a computer like a PC or a server. In addition, each of the server 200, the shared application server 500, and the market server 600 can be implemented with the hardware configuration shown in FIG. 11, for example.

Further, although the external terminal 400 has been described as another element of the information processing system in accordance with this embodiment, this embodiment is not limited thereto. This embodiment can be applied to various devices such as, for example, a communication device like a portable phone, an IC card, a video/music reproducing device (or a video/music recording/reproducing device), a game machine, or a computer like a PC. In addition, the external terminal 400 can be implemented with a hardware configuration similar to that of the information processing device 100, for example.

(Program in Accordance with this Embodiment)

By a program for causing a computer to function as the information processing device in accordance with this embodiment (e.g., a program that can execute a process in accordance with the information processing method in accordance with this embodiment, such as the process of (1) (the determination process) to the process of (3) (the execution process)), it is possible to cause a shared application, which can perform processes corresponding to a plurality of services, to behave differently for each service.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the information processing device in accordance with this embodiment can separately include the determination unit 110, the process control unit 112, and the processing unit 114 shown in FIG. 10 (for example, each unit can be implemented by an individual processing circuit).

In addition, although the aforementioned description shows that a program (a computer program) for causing a computer to function as the information processing device in accordance with this embodiment is provided, this embodiment can further provide a recording medium having the program recorded thereon.

The aforementioned configurations are merely illustrative configurations of this embodiment. Needless to say, such a configuration belongs to the technical scope of this embodiment.

Additionally, the present technology may also be configured as below.

(1) An information processing device comprising:

a determination unit that determines, based on process-related information acquired from a first server that provides a service, if a process based on the process-related information is executable;

a process control unit that makes, if it is not determined that the process is executable, the process based on the process-related information executable by an application that performs processes corresponding to a plurality of services; and a processing unit that causes the application to execute the process based on the process-related information, wherein the process control unit causes a second server to generate, based on the process-related information, a processing instruction that is based on the process-related information, and the processing unit causes the application to execute a process indicated by the generated processing instruction.

(2) The information processing device according to (1), further comprising a communication unit that communicates with a server, wherein when the process-related information includes identifying information that identifies the second server and a parameter defining a type of a process, the determination unit determines that the process is not executable, and the process control unit causes the communication unit to transmit a generation request including the parameter to a server indicated by the identifying information, and causes the server to generate the processing instruction corresponding to the parameter.

(3) The information processing device according to (1) or (2), wherein when the process-related information includes the processing instruction and permission information that limits a process indicated by the processing instruction, the determination unit determines that the process is executable, and the processing unit causes the application to execute the process based on the processing instruction within a limit indicated by the permission information.

(4) The information processing device according to (2) or (3), further comprising a communication unit that communicates with a server, wherein when the process-related information further includes a setting instruction for changing a process to be executed, the determination unit determines that the process is not executable, the process control unit causes a server indicated by the setting instruction to transmit setting data corresponding to the setting instruction, and the processing unit causes the application to execute a process using the acquired setting data.

(5) The information processing device according to any one of (2) to (4), further comprising a communication unit that communicates with a server, wherein when the process-related information further includes condition information indicating a condition related to a version of the application that is permitted to execute the process, the determination unit determines if the application satisfies the condition indicated by the condition information, and the process control unit, if it is not determined that the application satisfies the condition, causes a server storing update data for updating the application to transmit the update data, and updates the application using the acquired update data.

(6) The information processing device according to (5), wherein the process control unit, if it is not determined that the application satisfies the condition, interrupts execution of the process of the application that is based on the process-related information, and resumes the process of the application that is based on the process-related information after the application is updated.

(7) An information processing method comprising:

determining, based on process-related information acquired from a first server that provides a service, if a process based on the process-related information is executable;

making, if it is not determined that the process is executable, the process based on the process-related information executable by an application that performs processes corresponding to a plurality of services; and executing, with the application, the process based on the process-related information, wherein the step of making the execution of the process executable includes causing a second server to generate, based on the process-related information, a processing instruction that is based on the process-related information, and the executing step includes executing a process indicated by the generated processing instruction.

(8) A program causing a computer to execute:

determining, based on process-related information acquired from a first server that provides a service, if a process based on the process-related information is executable;

making, if it is not determined that the process is executable, the process based on the process-related information executable by an application that performs processes corresponding to a plurality of services; and executing, with the application, the process based on the process-related information, wherein the step of making the execution of the process executable includes causing a second server to generate, based on the process-related information, a processing instruction that is based on the process-related information, and the executing step includes executing a process indicated by the generated processing instruction.

(9) An information processing system comprising:

an information processing device; and a server that communicates with the information processing device, wherein the information processing device includes a determination unit that determines, based on process-related information acquired from a first server that provides a service, if the process based on the process-related information is executable;

a process control unit that makes, if it is not determined that the process is executable, the process based on the process-related information executable by an application that performs processes corresponding to a plurality of services; and a processing unit that causes the application to execute a process based on the process-related information, wherein the process control unit causes a second server to generate, based on the process-related information, a processing instruction that is based on the process-related information, and wherein the processing unit causes the application to execute a process indicated by the generated processing instruction.

What is claimed is:

1. An information processing device connectable by way of a network to a first server and a second server, said information processing device comprising:
   a determination unit that determines, based on process-related information acquired from the first server that provides a service, if a process based on the process-related information is executable without additional information from the first server;
   a process control unit that makes, if it is not determined that the process is executable, the process based on the process-related information executable by an application that performs processes corresponding to a plurality of services; and
   a processing unit that causes the application to execute the process based on the process-related information,
   wherein when the determination unit determines that the process is executable the processing unit causes the application to execute the process based on the process-related information and when the determination unit determines that the process is not executable (i) the process control unit causes the second server to generate, based on the process-related information, a processing instruction that is based on the process-related information, and (ii) the processing unit causes the application to execute a process indicated by the generated processing instruction, such that the application which is able to perform the processes corresponding to the plurality of services is caused to behave differently for each service by performing different operations thereon.

2. The information processing device according to claim 1, further comprising a communication unit that communicates with a server, wherein
   when the process-related information includes identifying information that identifies the second server and a parameter defining a type of a process,
   the determination unit determines that the process is not executable, and
   the process control unit causes the communication unit to transmit a generation request including the parameter to a server indicated by the identifying information, and causes the server to generate the processing instruction corresponding to the parameter.

3. The information processing device according to claim 1, wherein when the process-related information includes the processing instruction and permission information that limits a process indicated by the processing instruction,
   the determination unit determines that the process is executable, and
   the processing unit causes the application to execute a process based on the processing instruction within a limit indicated by the permission information.

4. The information processing device according to claim 2, further comprising a communication unit that communicates with a server, wherein
   when the process-related information further includes a setting instruction for changing a process to be executed,
   the determination unit determines that the process is not executable,
   the process control unit causes a server indicated by the setting instruction to transmit setting data corresponding to the setting instruction, and
   the processing unit causes the application to execute a process using the acquired setting data.

5. The information processing device according to claim 2, further comprising a communication unit that communicates with a server, wherein
   when the process-related information further includes condition information indicating a condition related to a version of the application that is permitted to execute the process,
   the determination unit determines if the application satisfies the condition indicated by the condition information, and
   the process control unit, if it is not determined that the application satisfies the condition, causes a server storing update data for updating the application to transmit the update data, and updates the application using the acquired update data.

6. The information processing device according to claim 5, wherein the process control unit, if it is not determined that the application satisfies the condition, interrupts execution of the process of the application that is based on the process-related information, and resumes the process of the application that is based on the process-related information after the application is updated.

7. An information processing method for use with an information processing device connectable by way of a network to a first server and a second server, said method comprising:
   determining, based on process-related information acquired from the first server that provides a service, if a process based on the process-related information is executable without additional information from the first server;
   making, if it is not determined that the process is executable, the process based on the process-related information executable by an application that performs processes corresponding to a plurality of services; and
   executing, with the application, the process based on the process-related information,
   wherein when the determination unit determines that the process is executable the application is caused to execute the process based on the process-related information and when the determination unit determines that the process is not executable (i) the step of making the execution of the process executable includes causing the second server to generate, based on the process-related information, a processing instruction that is based on the process-related information, and (ii) the executing step includes executing a process indicated by the generated processing instruction, such that the application which is able to perform the processes corresponding to the plurality of services is caused to behave differently for each service by performing different operations thereon.

8. A non-transitory computer readable medium having stored thereon a program causing a computer to execute:
   determining, based on process-related information acquired from a first server that provides a service, if a process based on the process-related information is executable without additional information from the first server;

making, if it is not determined that the process is executable, the process based on the process-related information executable by an application that performs processes corresponding to a plurality of services; and executing, with the application, the process based on the process-related information, wherein the computer is connectable by way of a network to the first server and the second server, and wherein when the determination unit determines that the process is executable the application is caused to execute the process based on the process-related information and when the determination unit determines that the process is not executable (i) the step of making the execution of the process executable includes causing a second server to generate, based on the process-related information, a processing instruction that is based on the process-related information, and (ii) the executing step includes executing a process indicated by the generated processing instruction, such that the application which is able to perform the processes corresponding to the plurality of services is caused to behave differently for each service by performing different operations thereon.

9. An information processing system comprising:

an information processing device; and a first server and a second server that communicates with the information processing device, wherein the information processing device includes a determination unit that determines, based on process-related information acquired from the first server that provides a service, if a process based on the process-related information is executable without additional information from the first server;

a process control unit that makes, if it is not determined that the process is executable, the process based on the process-related information executable by an application that performs processes corresponding to a plurality of services; and a processing unit that causes the application to execute the process based on the process-related information, wherein when the determination unit determines that the process is executable the processing unit causes the application to execute the process based on the process-related information and when the determination unit determines that the process is not executable (i) the process control unit causes the second server to generate, based on the process-related information, a processing instruction that is based on the process-related information, and (ii) the processing unit causes the application to execute a process indicated by the generated processing instruction, such that the application which is able to perform the processes corresponding to the plurality of services is caused to behave differently for each service by performing different operations thereon.

\* \* \* \* \*